(12) United States Patent
Suzuki et al.

(10) Patent No.: US 12,409,588 B2
(45) Date of Patent: Sep. 9, 2025

(54) PRODUCT AND METHOD OF MANUFACTURING PRODUCT

(71) Applicant: CANON KABUSHIKI KAISHA, Tokyo (JP)

(72) Inventors: Takahiro Suzuki, Tokyo (JP); Kei Oikawa, Kawasaki (JP); Kimitaka Arai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1140 days.

(21) Appl. No.: 17/005,723

(22) Filed: Aug. 28, 2020

(65) Prior Publication Data

US 2020/0391419 A1    Dec. 17, 2020

Related U.S. Application Data

(63) Continuation of application No. PCT/JP2019/007830, filed on Feb. 28, 2019.

(30) Foreign Application Priority Data

| Mar. 5, 2018 | (JP) | 2018-039006 |
| Jun. 5, 2018 | (JP) | 2018-108091 |
| Sep. 5, 2018 | (JP) | 2018-166090 |
| Feb. 20, 2019 | (JP) | 2019-027995 |

(51) Int. Cl.
    *B29C 45/00*    (2006.01)
(52) U.S. Cl.
    CPC ...... *B29C 45/0017* (2013.01); *B29C 45/0001* (2013.01); *B29K 2995/0022* (2013.01)

(58) Field of Classification Search
    CPC ............ B29C 45/0017; B29C 45/0001; B29K 2995/0022
    See application file for complete search history.

(56) References Cited

U.S. PATENT DOCUMENTS

| 8,440,287 B2 | 5/2013 | Shimizu et al. |
| 8,507,073 B2 | 8/2013 | Nishikawa et al. |
| 10,798,838 B2 | 10/2020 | Oikawa |
| 2004/0265543 A1 | 12/2004 | Komatsu et al. |

(Continued)

FOREIGN PATENT DOCUMENTS

| CN | 1539617 | 10/2004 |
| CN | 1539617 A | 10/2004 |

(Continued)

OTHER PUBLICATIONS

JP 2009134271 A Machine Translation (Year: 2009).*

(Continued)

*Primary Examiner* — Travis M Figg
(74) *Attorney, Agent, or Firm* — Venable LLP

(57) ABSTRACT

A product includes a first area and a second area. Each area includes areas having a first optical property and areas having a second optical property. The areas having the first optical property and the areas having the second optical property are arranged under a specific rule. In the first area, convex portions whose height is equal to or smaller than a predetermined height or no convex portions are formed. In the second area, convex portions whose height is larger than the predetermined height are formed.

17 Claims, 26 Drawing Sheets

(56) References Cited

U.S. PATENT DOCUMENTS

| | | | |
|---|---|---|---|
| 2006/0134381 A1* | 6/2006 | Homburg | B60R 13/0256 428/141 |
| 2011/0033670 A1* | 2/2011 | Nishikawa | B29C 45/16 428/162 |
| 2012/0196086 A1* | 8/2012 | Shimizu | B60R 13/0256 428/141 |
| 2018/0063979 A1 | 3/2018 | Oikawa | |
| 2019/0084200 A1 | 3/2019 | Oikawa | |
| 2019/0389110 A1 | 12/2019 | Sano et al. | |
| 2020/0031023 A1 | 1/2020 | Nagoya et al. | |

FOREIGN PATENT DOCUMENTS

| | | | | |
|---|---|---|---|---|
| CN | 101688934 A | * | 3/2010 | G02B 5/1871 |
| CN | 101945745 A | | 1/2011 | |
| CN | 101945745 A1 | | 1/2011 | |
| EP | 2581248 B1 | * | 4/2013 | B60K 1/00 |
| JP | 59-123628 A | | 7/1984 | |
| JP | 8-72141 A | | 3/1996 | |
| JP | 2006-175863 | | 7/2006 | |
| JP | 2006-175863 A | | 7/2006 | |
| JP | 2009-517246 | | 4/2009 | |
| JP | 2009-517246 A | | 4/2009 | |
| JP | 2009134271 A | * | 6/2009 | |
| JP | 2015-020367 A | | 2/2015 | |
| JP | 2015-74400 A | | 4/2015 | |
| JP | 2018-176564 A | | 11/2018 | |
| WO | 2007/061201 A1 | | 5/2007 | |
| WO | 2011/043117 A1 | | 4/2011 | |
| WO | 2019/172075 A1 | | 9/2019 | |

OTHER PUBLICATIONS

International Search Report in International Application No. PCT/JP2019/007830 (May 2019).

Third Office Action in Chinese Application No. 201980016816.4 (Sep. 2022).

First Office Action in Chinese Application No. 201980016816.4 (Sep. 2021).

* cited by examiner

PRIOR ART

■ : 50 μm
□ : 5–15 μm

■ : 30 (GLOSSINESS VALUE)
□ : 80 (GLOSSINESS VALUE)

FIG.17

| RESOLUTION (dpi) | BIT DIAMETER (mm) | DEPTH OF CUT (mm) | | | | | | | |
|---|---|---|---|---|---|---|---|---|---|
| | | 0.001 | 0.002 | 0.005 | 0.01 | 0.02 | 0.05 | 0.1 | 0.2 |
| 50 | 0.01 | 89.99 | 89.98 | 89.97 | | | | | |
| | 0.02 | 89.98 | 89.96 | 89.92 | 89.89 | | | | |
| | 0.1 | 89.89 | 89.79 | 89.48 | 89.01 | 88.25 | 87.26 | | |
| | 0.2 | 89.78 | 89.57 | 88.93 | 87.92 | 86.26 | 81.78 | 79.04 | |
| | 1 | 88.91 | 87.81 | 81.78 | 79.15 | 68.53 | 37.96 | | |
| | 2 | 87.81 | 85.62 | 79.07 | 68.20 | 46.61 | | | |
| 100 | 0.01 | 89.96 | 89.93 | 89.89 | 89.56 | | | | |
| | 0.02 | 89.92 | 89.84 | 89.67 | | | | | |
| | 0.1 | 89.57 | 89.14 | 87.92 | 86.06 | 82.99 | 79.04 | 46.17 | |
| | 0.2 | 89.13 | 88.26 | 85.73 | 81.67 | 74.22 | 57.13 | | |
| | 1 | 85.62 | 81.25 | 68.20 | 46.61 | 4.10 | | | |
| | 2 | 81.24 | 72.49 | 46.28 | 2.79 | | | | |
| 1200 | 0.01 | 84.32 | 79.80 | 74.22 | 26.89 | | | | |
| | 0.02 | 78.01 | 67.28 | 42.67 | | | | | |
| | 0.1 | 27.52 | | | | | | | |
| | 0.2 | | | | | | | | |
| | 1 | | | | | | | | |
| | 2 | | | | | | | | |

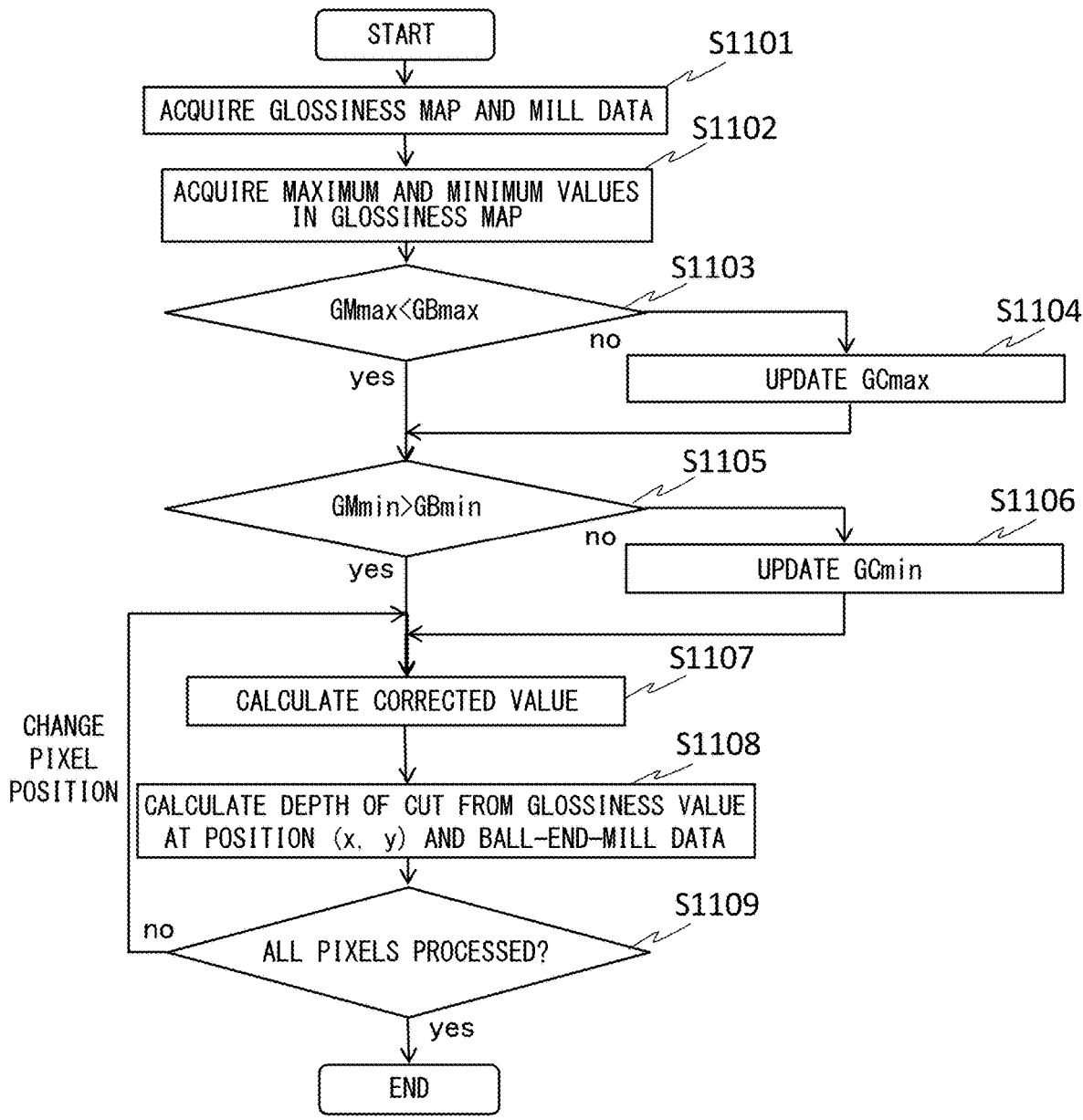

PLAN VIEW (GLOSSINESS DISTRIBUTION)

SIDE VIEW (CENTER PORTION OF SURFACE)

PRIOR ART

PRODUCT AND METHOD OF MANUFACTURING PRODUCT

CROSS-REFERENCE TO RELATED APPLICATIONS

This application is a Continuation of International Patent Application No. PCT/JP2019/007830, filed Feb. 28, 2019, which claims the benefit of Japanese Patent Application No. 2018-039006, filed Mar. 5, 2018, Japanese Patent Application No. 2018-108091, filed Jun. 5, 2018, Japanese Patent Application No. 2018-166090, filed Sep. 5, 2018, and Japanese Patent Application No. 2019-027995, filed Feb. 20, 2019, those of which are hereby incorporated by reference herein in their entirety.

BACKGROUND OF THE INVENTION

Field of the Invention

The present invention relates to a resin component whose outer surface includes an area in which a process such as lettering is performed, the resin component on which the process such as lettering has been performed, an electronic device in which the resin component is used, and a method of manufacturing the resin component.

Description of the Related Art

A plate-like or box-like resin component is used in a housing or a case of an electronic device, such as a printer. The outer surface of the resin component is required to have attractive design and functionality such as soil resistance and scratch resistance. For example, in a conventional art, Japanese Patent Application Publication No. 2009-134271 proposes a configuration that achieves both aesthetic appearance and inconspicuousness of dirt such as fingerprints. In this configuration, a design pattern is formed on an external surface, and includes a flat glossy surface and a nonglossy surface having convex portions that project from a flat surface.

On the outer surface of the resin component, which constitutes a housing or a case of an electronic device, a maker-name or model-name logo, or a design or a trade mark including numerals, characters, or a figure may be formed. Generally, such information is given, after the resin component is molded, by coating or surface treatment performed by heating. Such coating is performed by using a method such as hot stamping, which thermally transfers foil onto the resin component. The foil is made from metal and pigment for example, and serves as an information bearing member. In another case, the coating may be performed by sticking an information bearing member such as a seal, or by painting or spraying paint, pigment, or powder.

In a case where a resin component having the above-described convex portions, or a concave-and-convex structure, is manufactured through injection molding or the like, the outer surface of the resin component may include a plurality of surfaces having different angles with respect to a mold releasing direction. In this case, the concave-and-convex structure formed on the surfaces may have various limitations. For example, if a component surface is curved or inclined with respect to the mold releasing direction, it is necessary to prevent the concave-and-convex structure of the component surface from becoming a so-called undercut, for achieving good releasability of the mold. For this reason, there is a case in which no concave-and-convex structure is formed in one area of the outer surface of the resin component. In addition, there is a case in which separate molds are used for portions whose concave-and-convex structures have different orientations. In this case, each mold will be opened, for example, toward a direction in which a corresponding concave-and-convex structure is prevented from becoming an undercut.

Note that the external surface or the outer surface designed as described above, or the external surface or the outer surface on which the coating process or the surface treatment process is performed is not necessarily limited to a housing of an electronic device, or a front surface of a case of the electronic device. For example, a door, a hatch, or a cover of a device may include a resin component that is usually not exposed but can be seen by a user when the door, the hatch, or the cover is opened; and the above-described design may be formed on such a resin component. Hereinafter, a surface (component surface) of the resin component, which has a design that can be visually recognized by a user, is simply referred to as an outer surface.

In a case where a logo or the like is given to an outer surface of a resin component through a process such as hot stamping, the outer surface is required to be smooth to some extent. That is, the outer surface is required to be a surface that can be stably processed. However, the outer surface of the resin component may have a design pattern having a difference in height (concave and convex portions) for the design and functionality, as described above. However, if the process such as hot stamping is performed on the design pattern having the difference in height, the logo or the like may not be accurately transferred onto the resin component, or may not be fixed to the resin component and may easily peel off the resin component. As a result, the quality of the logo or the like may deteriorate. To avoid this problem, one solution is to smooth an area (hereinafter referred to as a first area) of the outer surface, on which the logo is to be formed, by forming no design patterns on the area. However, since the presence and absence of the design pattern is easily recognized by visual characteristics of humans, a boundary between the first area and the other area (hereinafter referred to as a second area) becomes conspicuous, possibly deteriorating the design.

In addition, if no concave-and-convex structure is formed on a curved surface for improving the mold releasability, a conspicuous gap that is visually recognized by humans is formed on the outer surface of the resin component in the vicinity of a boundary between an area in which the concave-and-convex structure is formed and an area in which no concave-and-convex structure is formed, possibly deteriorating the design.

In addition, if separate molds are used for avoiding an undercut, an undesired artifact, such as a parting line, may be produced at a position corresponding to a place where molds are fixed to each other. Since such a parting line is produced in a portion of the resin component in which the concave-and-convex structure is continuously formed, it is difficult to remove only the parting line without damaging the concave-and-convex structure, in a postprocess such as cutting or grinding.

For this reason, it has been desired to achieve a technique that forms a logo or the like, through a process, on an outer surface on which a design pattern having a difference in height (concave and convex portions) is formed, and that allows an inclined surface or a curved surface to be formed in the outer surface, without significantly deteriorating the quality of external appearance in design.

SUMMARY OF THE INVENTION

According to a first aspect of the present invention, a product includes a first area and a second area, each area including areas having a first optical property and areas having a second optical property, the areas having the first optical property and the areas having the second optical property are arranged under a specific rule. In the first area, convex portions whose height is equal to or smaller than a predetermined height or no convex portions are formed. In the second area, convex portions whose height is larger than the predetermined height are formed.

According to a second aspect of the present invention, a method of manufacturing a product includes molding a molded product including an outer surface, and processing a first area of the molded product. The outer surface includes the first area and a second area in which areas having a first optical property and areas having a second optical property are arranged under a specific rule. Convex portions whose height is equal to or smaller than a predetermined height or no convex portions are formed in the first area. Convex portions whose height is larger than the predetermined height are formed in the second area.

Further features of the present invention will become apparent from the following description of exemplary embodiments with reference to the attached drawings.

BRIEF DESCRIPTION OF THE DRAWINGS

FIG. 17 is a table illustrating one example of cutting tool information.

FIG. 18 is a flowchart illustrating other procedures for controlling the manufacturing apparatus used for the mold.

DESCRIPTION OF THE EMBODIMENTS

Hereinafter, embodiments of the present invention will be described with reference to the accompanying drawings. Note that since the configurations described below are merely examples, detailed configurations or the like may be changed as appropriate by a person skilled in the art, without departing the spirit of the present invention.

The product in the following embodiments can be used for an electronic product, such as a recording apparatus (printer), that includes electronic components, and for other products, such as an exterior component or an interior component of a vehicle such as an automobile, that are required to have high quality external appearance. In the following embodiments, the resin component is used, for example, as an exterior component of a printer (recording apparatus) with a document reader.

First Embodiment

Figure 1:
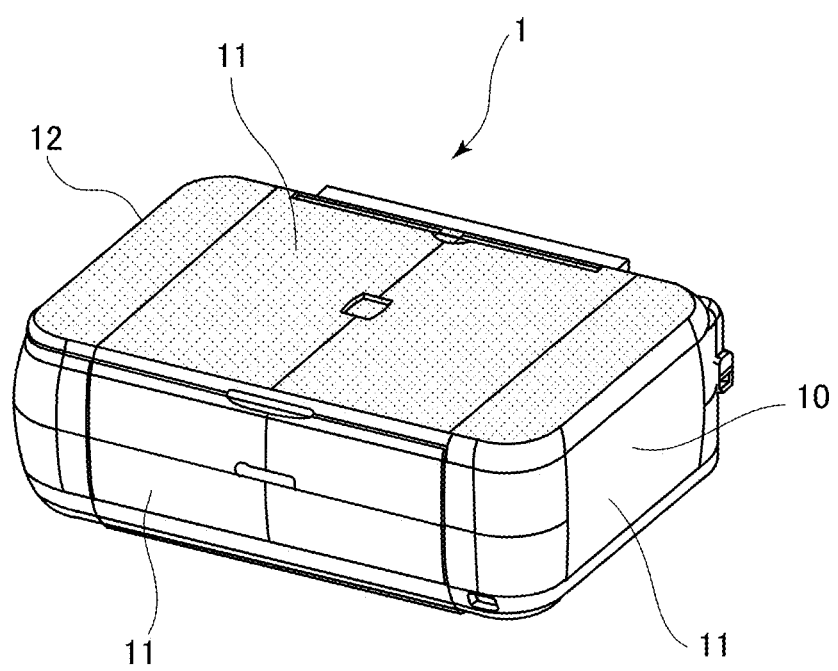
FIG. 1 is a perspective view illustrating an external appearance of a printer that is an electronic device of a first embodiment of the present invention.

FIG. 1 is an external view of an electronic device that is one example of a product for which the present invention has been applied. In particular, the electronic device is a printer. In FIG. 1, a printer 1 is a multifunction printer, for example; and outer surfaces (exterior surfaces) of a document cover 12 and a housing 10 are made of resin with a predetermined color, such as black. Since an outer surface 11 of the printer 1 is conspicuous to a user, the outer surface 11 is required to have high quality external appearance, and thus has a design pattern.

Figure 2A:
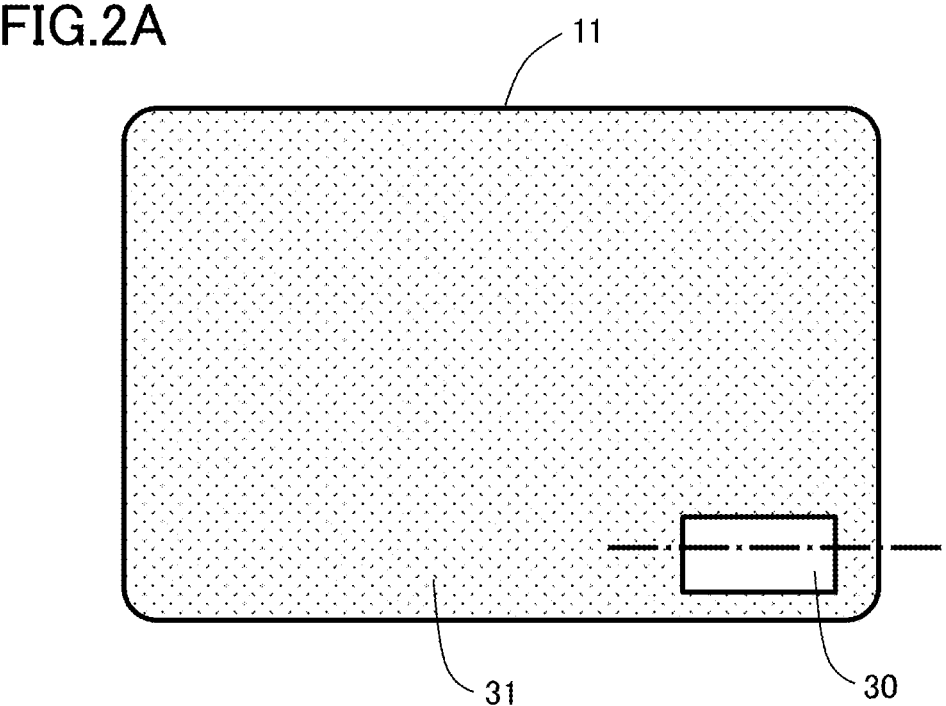
FIG. 2A is a schematic plan view illustrating a structure of a resin component of a conventional art.
Figure 2B:
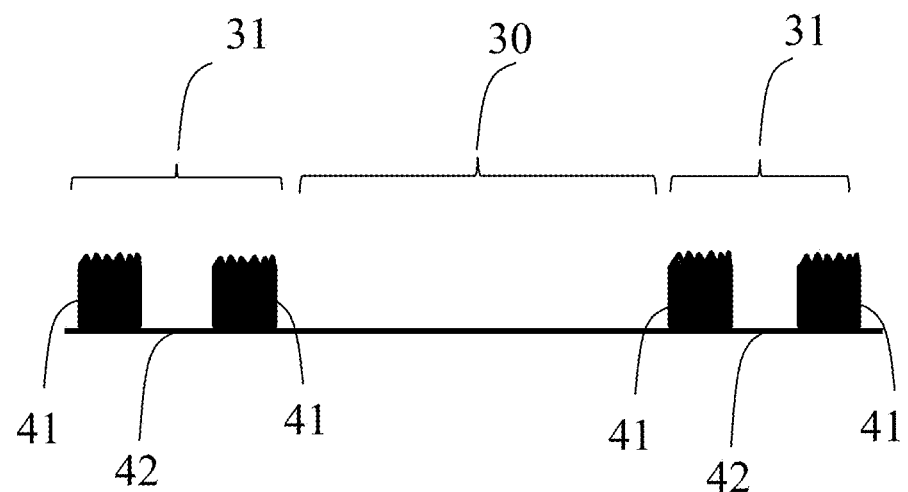
FIG. 2B is a schematic cross-sectional view illustrating the structure of the resin component of the conventional art.

FIGS. 2A and 2B illustrate a structure of an outer surface of a conventional product. FIG. 2A illustrates the whole of the outer surface 11, and FIG. 2B illustrates a cross section of the product, taken along an alternate long and short dashed line of FIG. 2A. As illustrated in FIG. 2A, the conventional outer surface 11 includes a first area 30 and a second area 31. The first area 30 is an area in which a piece of information, such as a logo, can be formed by printing or the like. The second area 31 is an area other than the first area.

As illustrated in FIG. 2B, the second area 31 of FIG. 2A has a surface pattern including convex portions 41 (e.g. deep-color portions in FIG. 2A) and flat portions 42 (e.g. white-color portions in FIG. 2A). The convex portions 41 and the flat portions 42 have different optical properties. Thus, the second area 31 of the outer surface 11 has the design pattern constituted by the convex portions and the flat portions, for the design and functionality. In contrast, the first area 30 has no convex portions of the design pattern, as illustrated in FIG. 2B, for satisfactorily performing a process such as hot stamping for giving a logo or the like. In such a conventional structure, since the design pattern is discontinuous, a boundary between the first area 30 and the second area 31 is conspicuous, disadvantageously deteriorating the design.

Figure 3A:
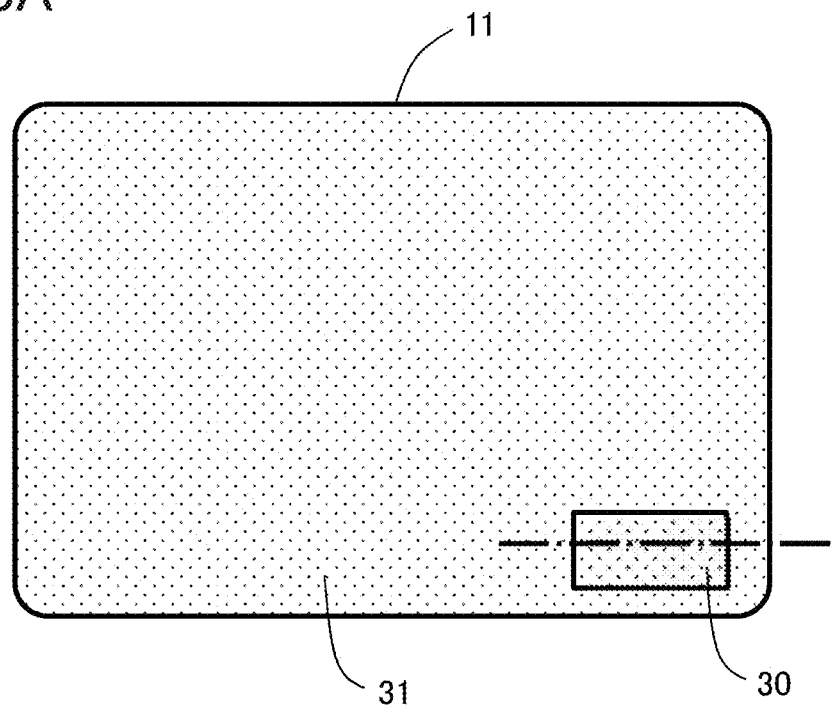
FIG. 3A is a schematic plan view illustrating a structure of a resin component of the first embodiment of the present invention.
Figure 3B:
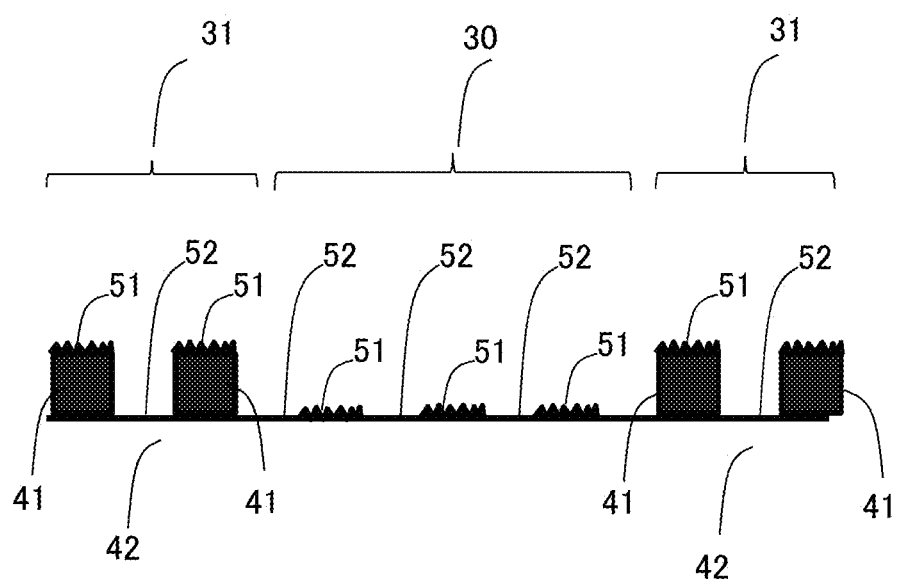
FIG. 3B is a schematic cross-sectional view illustrating the structure of the resin component of the first embodiment of the present invention.

In the first embodiment, however, for suppressing the deterioration of quality of external appearance caused by the conspicuous boundary between the first area 30 and the second area 31, a surface pattern as illustrated in FIGS. 3A and 3B is formed on the outer surface 11 of the resin component, which constitute the housing of the electronic device. Like FIGS. 2A and 2B, FIG. 3A illustrates the whole of the outer surface 11, and FIG. 3B illustrates a cross section, taken along an alternate long and short dashed line of FIG. 3A.

In the first embodiment, the design pattern (surface pattern) is formed across the first area 30 and the second area 31 on the outer surface 11 of the resin component of the housing of the electronic device. The design pattern (surface pattern) is constituted by areas with different optical properties (in particular, glossiness values). The areas constituting the surface pattern and having different glossiness values are constituted by nonglossy portions 51 and glossy portions 52, as illustrated in FIG. 3B. The nonglossy portions 51 have a first optical property and a lower glossiness value, and the glossy portions 52 have a second optical property and a higher glossiness value.

In the second area 31 illustrated in FIGS. 3A and 3B, each of the nonglossy portions 51 corresponds to a fine concave-and-convex structure formed on a top surface of a corresponding convex portion 41 whose height is larger than a predetermined height, and each of the glossy portions 52 corresponds to the surface of a corresponding flat portion 42. The second area 31 is formed so as to give an observer the same visual impression as that to the surface pattern of the second area of FIGS. 2A and 2B. In the first area 30, the convex portions 41 are not formed, and each of the nonglossy portions 51 is formed as a fine concave-and-convex structure formed on a flat surface. In another case, in the first area 30, the convex portions whose height is smaller than the above-described predetermined height is formed, and each of the nonglossy portions 51 is formed as a fine concave-and-convex structure formed on a top surface of a corresponding convex portion. Thus, a fine concave-and-convex structure corresponds to a nonglossy portion 51, and the surface of a flat portion corresponds to a glossy portion 52.

In the present embodiment, the nonglossy portion 51 having the first optical property and a lower glossiness value has the fine concave-and-convex structure, and the glossy portion 52 having the second optical property and a higher glossiness value has the flat surface. Thus, the nonglossy portion 51 and the glossy portion 52 have different surface roughness values.

In the present embodiment, a specific rule for arranging areas having the first optical property and areas having the second optical property is equal to a specific rule for arranging the convex portions whose height is equal to or smaller than the predetermined height and the convex portions whose height is larger than the predetermined height. However, since the nonglossy portion and the glossy portion can be formed by changing surface roughness, the specific rule for arranging areas having different optical properties may be different from the specific rule for arranging the convex portions whose height is equal to or smaller than the predetermined height and the convex portions whose height is larger than the predetermined height. That is, the arrangement pattern of the convex portions may be different from the design pattern in which the areas having different optical properties are arranged. That is, the arrangement pattern of the convex portions may be different from the pattern determined under a specific rule which arranges the areas having the first optical property and the areas having the second optical property.

As described above, on the top surface of the nonglossy portion 51, the fine concave-and-convex structure is formed for scattering incident light. The fine concave-and-convex structure is so fine that the structure is impossible or difficult to visually recognize through the naked eye. In contrast, the surface of the glossy portion 52 is formed smooth for specularly reflecting incident light.

That is, in the first embodiment, the nonglossy portion 51 and the glossy portion 52 have different surface roughness values. Specifically, as illustrated in FIG. 3B, the convex portion 41 has the fine concave-and-convex structure formed on the top surface (surface) of the convex portion 41, and the surface of the flat portion 42 is formed smooth.

In addition, in the first embodiment, the design pattern (surface pattern) constituted by the nonglossy portion 51 and the glossy portion 52 is formed also in the first area 30. However, the high convex portion 41 as in the second area may not be formed in the first area 30.

Thus, the height of the convex portion of the first area 30, that is, the height from the flat surface to the top surface of the convex portion is significantly smaller than the height of the convex portion of the second area 31.

For example, in the second area 31, it is preferable that the convex portion 41 project from the flat portion 42 by a value equal to or larger than 40 μm and equal to or smaller than 500 μm. If the height of the convex portion 41 is equal to or larger than 40 μm, the convex portion 41 can have soil resistance, so that fingerprints hardly adhere to the molded product. However, if the height of the convex portion 41 is equal to or larger than 500 μm, the area of the glossy portion that can be visually recognized becomes smaller depending on angles, so that a sense of high quality in design is suppressed.

The difference in height between the flat portion 42 and the convex portion 41 of the second area 31, that is, the difference in height between the glossy portion 52 and the nonglossy portion 51 can be obtained, for example, by using a white-light interferometer and measuring a height of the nonglossy portion with respect to the glossy portion. For example, the difference in height is defined as an average of values obtained by performing measurement at ten points of a portion of the molded product. The size of the portion is 1.0×1.4 mm, and the measurement is performed by using 3D optical profiler NewView7000 made by ZYGO Corporation and an objective lens with a magnification of 10 times.

The difference in glossiness, which is the difference in optical property between the nonglossy portion 51 and the glossy portion 52, may have any value as long as the difference in glossiness can be visually perceived by a user. Preferably, the difference in glossiness is ten or more. Note that glossiness values in this description were measured by using a glossmeter, which is designed to measure a specular glossiness at a reflection angle of 60° under JIS Z 8741. The measurement values on glossiness can be obtained by using a handy type gloss meter PG-1 made by NIPPON DENSHOKU INDUSTRIES CO. LTD. Specifically, the measurement values on glossiness can be obtained by setting the reflection angle at 60°, and pressing a measurement switch in a state where a photometer of the glossmeter is pressed against a glossy portion of the molded product.

In the first area 30, the difference in height between convex portions of the fine concave-and-convex structure, which forms the nonglossy portion 51, and the flat portion 42, which forms the glossy portion 52, is the difference in height between the nonglossy portion 51 and the glossy portion 52. The fine concave-and-convex structure of the nonglossy portion 51 is formed such that the difference in height is equal to or smaller than 15 μm. If the fine concave-and-convex structure is formed such that the difference in height is equal to or smaller than 15 μm, the nonglossy portion is formed such that each of the concave and convex portions is inconspicuous, and the process such as hot stamping is possible. The present inventors have found through an experiment that if the maximum step is equal to or smaller than 15 μm, the performance of transfer or fixing in hot stamping or painting is not lowered, and a design or a trade mark, such as a logo, numerals, characters, or a figure, can be given through the process.

Figure 20A:
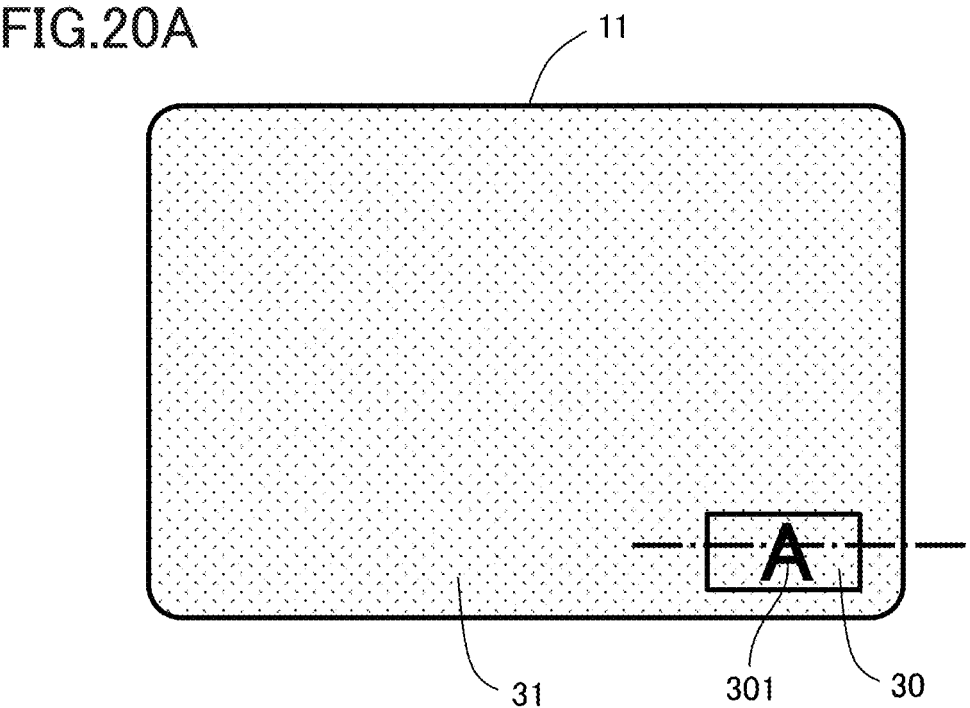
FIG. 20A is a diagram illustrating a structure of a surface of a resin component which is the first embodiment of the present invention, and on which a process to give a logo or the like has been performed.
Figure 20B:
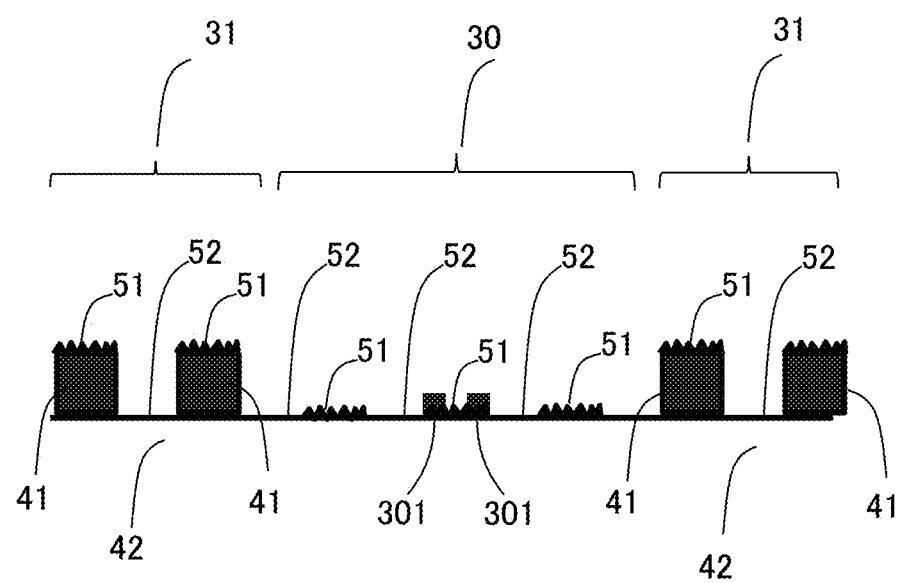
FIG. 20B is a diagram illustrating a structure of a section of the resin component which is the first embodiment of the present invention, and on which the process to give a logo or the like has been performed.
Figure 21A:
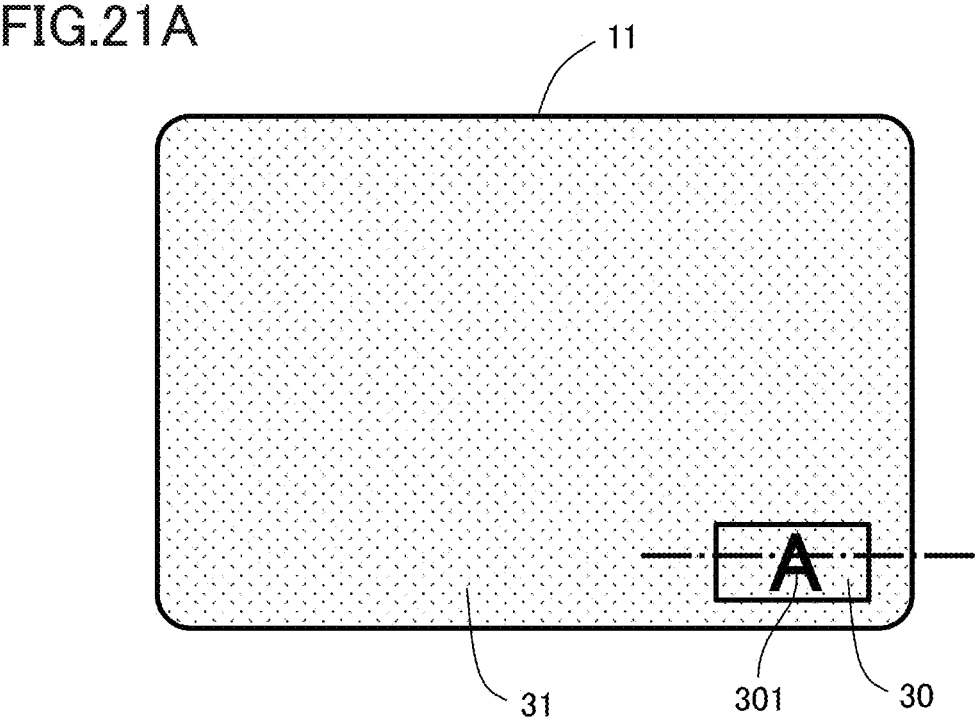
FIG. 21A is a diagram illustrating a structure of a surface of the resin component which is the first embodiment of the present invention, and on which a process to give a logo or the like has been performed.
Figure 21B:
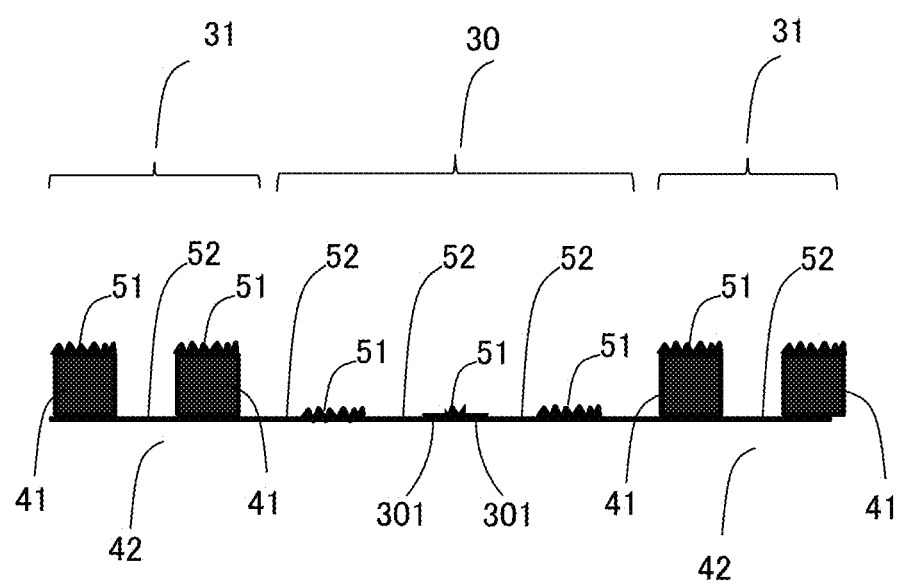
FIG. 21B is a diagram illustrating a structure of a section of the resin component which is the first embodiment of the present invention, and on which the process to give a logo or the like has been performed.

FIGS. 20A and 21A are plan views in which a character "A" is given to the first area 30 as one example of information 301, such as characters, numerals, a figure, or a logo. FIGS. 20B and 21B respectively illustrate cross sections taken along an alternate long and short dashed line of FIGS. 20A and 21A. If a portion to which the information has been given has a third optical property different from the first optical property and the second optical property, it is preferable because the information can be visually recognized easily.

As illustrated in FIG. 20B, when a sheet of foil is disposed on the fine concave-and-convex structure through hot stamping, or when ink is applied to the fine concave-and-convex structure through printing, the portion to which the information 301 has been given may have a height slightly larger than the height of the convex portions of the fine concave-and-convex structure.

In contrast, depending on stamping conditions applied when the information 301, such as characters, numerals, a figure, or a logo, is given, the portion to which the information 301 has been given may have a height slightly smaller than the height of the convex portions of the fine concave-and-convex structure, as illustrated in FIG. 21B.

In either case, in the first embodiment, the information 301, such as characters, numerals, a figure, or a logo, can be stably given to the first area 30 through the process.

As described above, in the first area 30 of the first embodiment, although the convex portions 41 as high as the convex portions 41 of the second area 31 are not formed, a surface pattern of nonglossy portions is formed by the fine concave-and-convex structure whose height is equal to or smaller than 15 μm, which allows the process to be performed on the first area 30. In addition, the design pattern including the glossy portion and the nonglossy portion is continuously formed on both the first area 30 and the second area 31, across the boundary between the first area 30 and the second area 31. Thus, the continuity of the design pattern is kept across the boundary between the first area 30 and the second area 31, so that the boundary is advantageously inconspicuous (that is, difficult to visually recognize). In the first area 30, the information 301, such as a logo, numerals, characters, or a figure, that represents a design or a trade mark is given through a process such as hot stamping. Thus, in the first embodiment, since a user perceives as the design pattern continuously extends from the second area 31 to a portion of the first area 30 that is very close to the information, such as a logo, numerals, characters, or a figure, that represents a design or a trade mark, the aesthetic appearance will not be lost. Thus, in the first embodiment, the design pattern (surface pattern) formed by arranging the areas with different optical properties and the information, such as a logo, that has been given through the process can coexist, with good appearance, on the outer surface of the resin component.

The surface pattern of glossy and nonglossy portions can be achieved as a geometrical design pattern, such as a checked pattern (see later-described FIGS. 8B and 9B, for example), that is formed on the outer surface 11 of the resin component. In this case, it is preferable that an area in which a convex portion (nonglossy portion) is formed and an area in which a flat portion (glossy portion) is formed have a width of 1 mm or more in a plan view. If the width is less than 1 mm, the glossy portion will be difficult for a user to visually recognize and may not be perceived as an intended pattern.

Note that the geometrical structure of the surface pattern given to the outer surface 11 of the resin component and constituted by the areas of glossy and nonglossy (or concave and convex) portions is not limited to the checked pattern. That is, the geometrical structure of the surface pattern may be any pattern as long as the concave and convex portions and the glossiness allow an observer to visually recognize the surface pattern and find the aesthetic appearance.

Figure 4A:
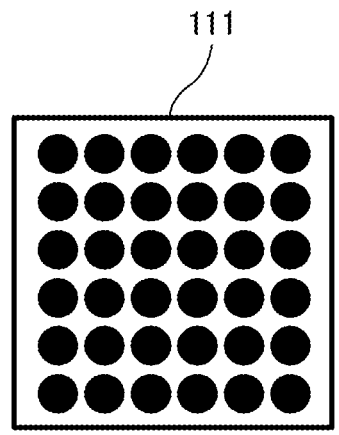
FIG. 4A is one example of a surface pattern that can be applied for the electronic device of the first embodiment of the present invention.
Figure 4B:
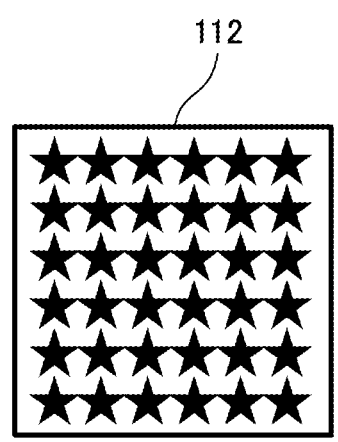
FIG. 4B is one example of a surface pattern that can be applied for the electronic device of the first embodiment of the present invention.
Figure 4C:
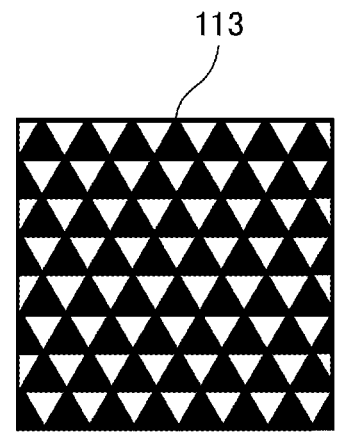
FIG. 4C is one example of a surface pattern that can be applied for the electronic device of the first embodiment of the present invention.

FIGS. 4A to 4C illustrate examples of a geometrical structure of the regular surface pattern formed on the outer surface 11 of the resin component and constituted by the areas of glossy and nonglossy portions (or the areas having different surface roughness values). FIG. 4A illustrates a polka-dotted pattern 111 in which circles are arranged. FIG. 4B illustrates a star-shaped pattern 112 in which stars are arranged. FIG. 4C illustrates a scale pattern 113 in which triangles are arranged. Thus, if the surface pattern, in which an identically-shaped glossy portion and an identically-shaped nonglossy portion (or portions having different surface roughness values) are repeatedly disposed under a specific rule, is used, the resin component can be easily manufactured advantageously. The patterns illustrated in FIGS. 4A to 4C are merely examples. Thus, the structure of the surface pattern in which the areas having different glossiness values (or the areas having different surface roughness values) are alternately arranged is not limited to these examples.

In the first embodiment, the material of the component including the outer surface 11 that constitutes a housing or a case of an electronic device may be a resin material such as ABS or HIPS (high impact polystyrene).

Next, a method of manufacturing a resin component of the first embodiment will be described. The resin component of the first embodiment, on which the above-described design pattern (surface pattern) is formed in the second area 31 and the first area 30, can be produced by using a so-called injection molding method, which injects resin from a gate into a cavity formed in a mold, and fills the cavity with the resin (molding process). Then, the information such as a logo is given to the first area 30 through a process such as hot stamping (machining process).

With these processes, the resin component that can be used as a housing of an electronic device such as a printer is completed.

Figure 5:
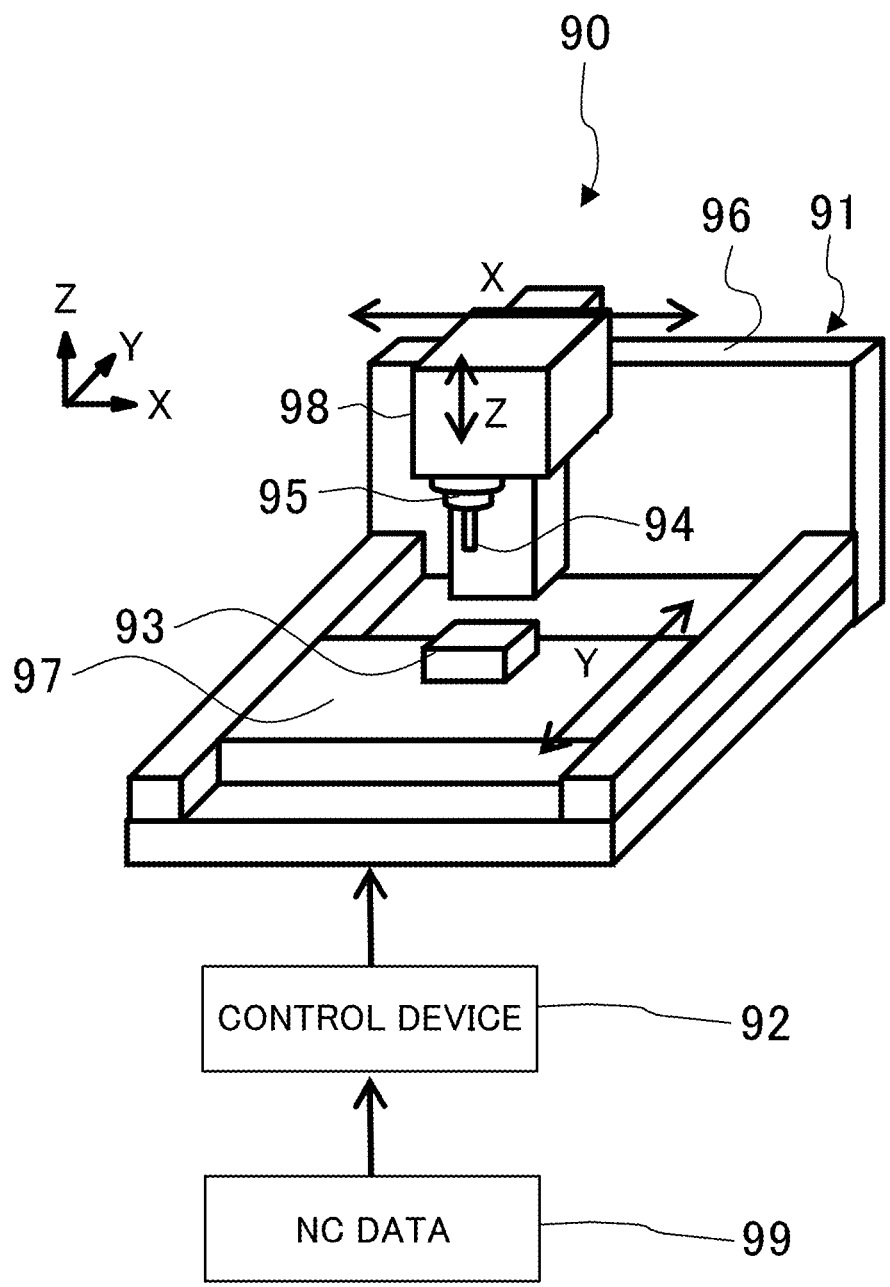
FIG. 5 is a schematic diagram illustrating one example of a manufacturing apparatus that machines a mold used for the resin component of the first embodiment of the present invention.

FIG. 5 illustrates a configuration of a machining center that manufactures a mold used to mold the resin component of the first embodiment. A machining center 90 of FIG. 5 includes a machine body 91 and a control device 92. The cavity may be formed by a plurality of pieces (cavity pieces) each of which forms one portion of the mold. Thus, if the cavity is formed by the cavity pieces, a transfer surface can be divided into pieces of the surface, and the pieces of the surface can be individually machined. Thus, even though a molded product has a complex shape, production cost for the mold can be reduced.

The machine body 91 is used to manufacture the mold (cavity piece) 93 by cutting the mold 93, which is an object to be machined. The machine body 91 includes a spindle 95, an X stage 96, a Y stage 97, and a Z stage 98. The spindle 95 is a spindle that supports a cutting tool 94.

As the cutting tool 94, an end mill can be suitably used. The spindle 95 rotates the cutting tool 94 on a Z axis. The Z stage 98 supports the spindle 95, and moves the cutting tool 94 in a Z-direction with respect to the mold 93. Similarly, the X stage 96 moves the cutting tool 94 in an X direction with respect to the mold 93, and the Y stage 97 moves the cutting tool 94 in a Y-direction with respect to the mold 93. With such a configuration, the machine body 91 moves an end of the cutting tool 94 in the X-, Y-, and Z-direction with respect to the mold 93, while rotating the cutting tool 94.

The control device 92 is a computer including a CPU and a memory, and controls the machine body 91 depending on NC data 99. The NC data 99 contains various instructions used in the cutting process, such as the amount of movement in the X-direction, the amount of movement in the Y-direction, the amount of movement in the Z-direction, rotational speed of the spindle, feed speed in the X-direction, feed speed in the Y-direction, and feed speed in the Z-direction. The control device 92 controls the machine body 91, and thereby can move the cutting tool 94 with respect to the mold 93 while rotating the cutting tool 94, so that a three-dimensional shape based on the NC data 99 can be formed in the mold 93 by cutting the mold 93.

Figure 6A:
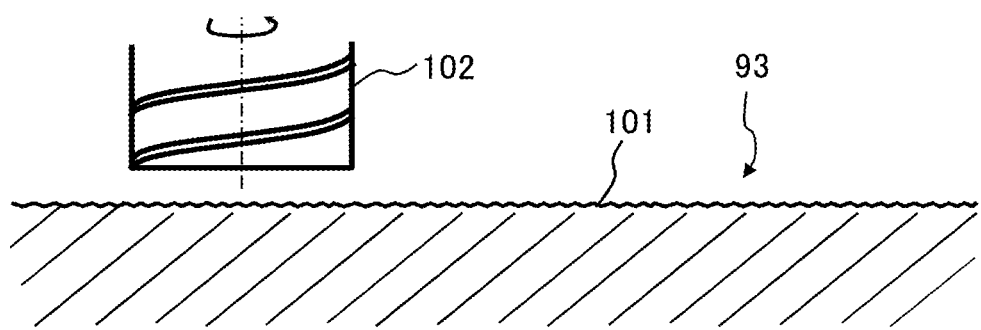
FIG. 6A is a diagram illustrating a machining process for the mold used for the resin component of the first embodiment of the present invention.
Figure 6B:
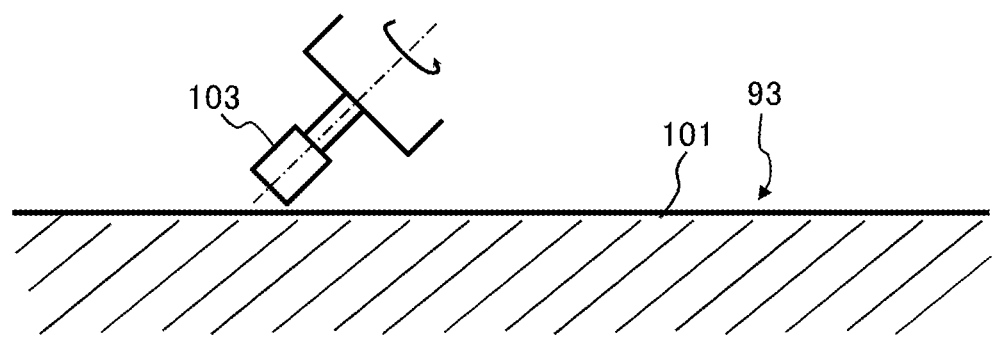
FIG. 6B is a diagram illustrating a machining process for the mold used for the resin component of the first embodiment of the present invention.
Figure 7A:
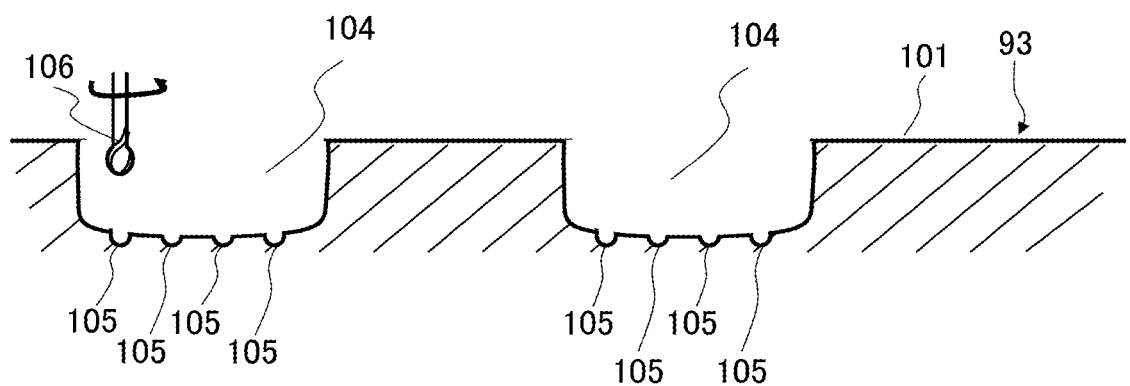
FIG. 7A is a diagram illustrating a machining process for the mold used for the resin component of the first embodiment of the present invention.
Figure 7B:
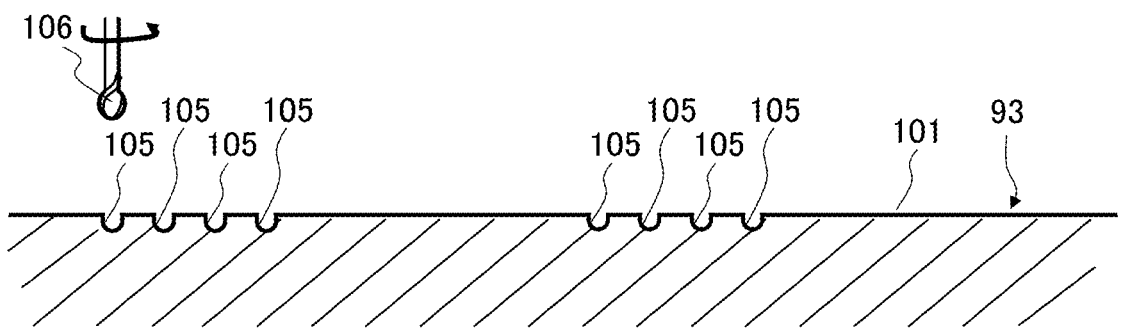
FIG. 7B is a diagram illustrating a machining process for the mold used for the resin component of the first embodiment of the present invention.

FIGS. 6A, 6B, 7A, and 7B illustrate processes for manufacturing the mold 93 used to mold the resin component of the first embodiment. FIG. 6A illustrates a first mold-machining process, FIG. 6B illustrates a second mold-machining process, and FIGS. 7A and 7B illustrate a third mold-machining process.

First, in the first mold-machining process illustrated in FIG. 6A, a surface 101 of the mold 93 is roughly machined. A radius end mill 102 is attached to the machining center of FIG. 5, as a cutting tool; and the surface of the mold 93 is cut, depending on the NC data 99, by scanning the surface 101 while rotating the radius end mill 102. Preferably, the surface 101 is cut in the first mold-machining process such that the flatness of the surface 101 is 10 μm or less, for eliminating a smoothing process to be performed in the second mold-machining process.

In the second mold-machining process of FIG. 6B, the surface 101 of the mold 93 is ground into a mirror surface by using a rotary grinder 103 and diamond paste. When the smooth mirror surface is transferred to the resin, the transferred portion forms the above-described glossy portion.

Preferably, the surface 101 is ground in the second mold-machining process such that the flatness of the surface 101 is 5 µm or less, so that no difference in depth is produced in concave portions 104 when the concave portions 104 are machined in the third mold-machining process.

In the third mold-machining process, the surface 101 of the mold 93 is machined by using a ball end mill 106. FIG. 7A illustrates a process for forming a portion of the mold used to transfer the shape of the above-described second area 31 to the resin component. FIG. 7B illustrates a process for forming a portion of the mold used to transfer the shape of the first area 30 to the resin component.

As illustrated in FIG. 7A, when the portion of the mold corresponding to the second area 31 is machined, the portion is cut and scanned, depending on the NC data 99, while the ball end mill 106 is rotated, so that the concave portions 104 are formed. When the concave portions 104 are transferred to the resin component, the convex portions 41 are formed in the resin component. The portion of the mold is further scanned by the ball end mill 106 for forming a plurality of fine concave portions 105 in the bottom surface of each concave portion 104. With this operation, a fine concave-and-convex structure to form the rough surface that is a nonglossy portion is formed in the bottom surface of the concave portion 104.

When the fine concave-and-convex structure is transferred to the resin component through injection molding, a fine concave-and-convex structure (rough surface) is formed on the convex portion 41. The fine concave-and-convex structure formed on the convex portion 41 is a light scattering surface of the nonglossy portion 51. In addition, as illustrated in FIG. 7B, for forming a portion of the mold corresponding to the first area 30, a plurality of concave portions 105 are formed in the portion of the surface 101 of the mold at positions corresponding to the nonglossy portions 51. As illustrated in FIG. 7B, in the first area 30, the concave portions as large as the concave portions 104 of FIG. 7A are not formed. As illustrated in FIGS. 7A and 7B, the portions of the mold in which many fine concave portions 105 are formed correspond to the nonglossy portions 51 that scatter light, and the flat portions of the mold in which the fine concave portions 105 are not formed correspond to the glossy portions 52.

Note that the material of the mold 93 machined as described above may be stainless steel. However, the material may be any other material for the machinability and durability in the injection molding.

In the above description, the molding for the resin component through injection molding and the manufacturing process for the mold have been described. However, the manufacturing method is not limited to the above description. The molding for the above-described resin component including the second area 31 and the first area 30 may be performed using another appropriate method other than the above-described injection molding.

Hereinafter, specific examples in the first embodiment will be described.

Example 1

Figure 8A:
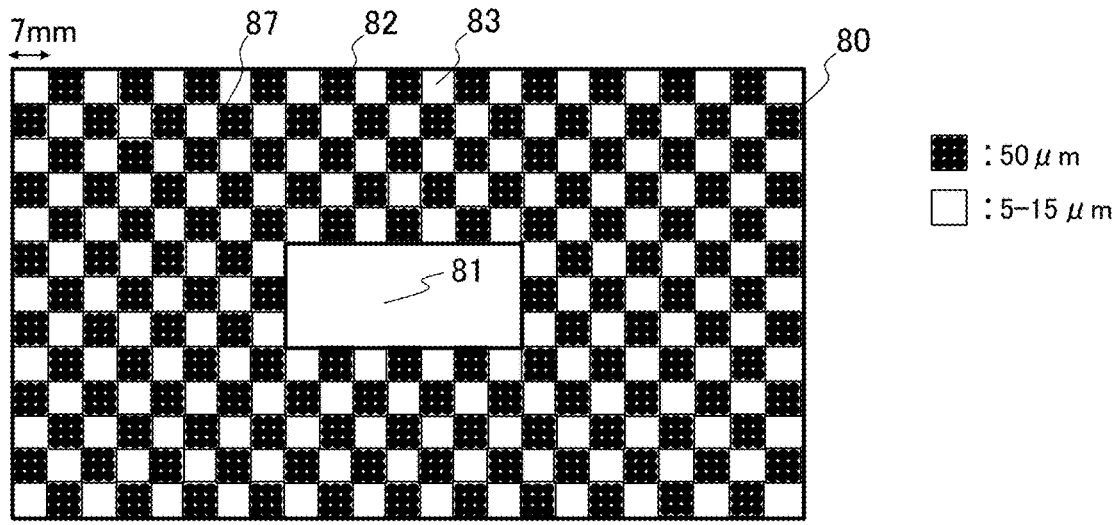
FIG. 8A is a diagram illustrating a structure of a surface of a resin component of Example 1.
Figure 8B:
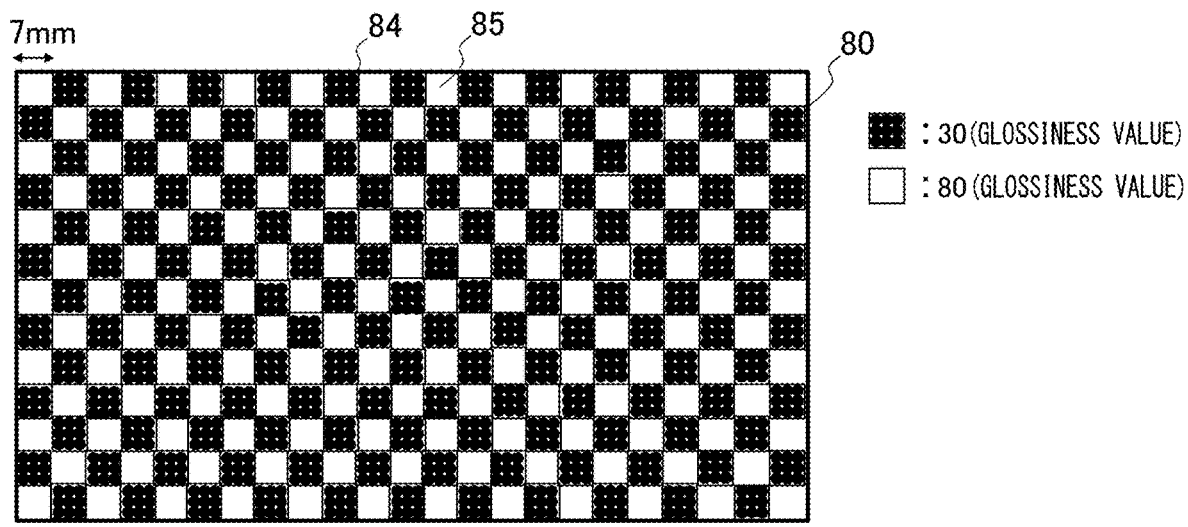
FIG. 8B is a diagram illustrating an optical property of the surface of the resin component of Example 1.
Figure 8C:
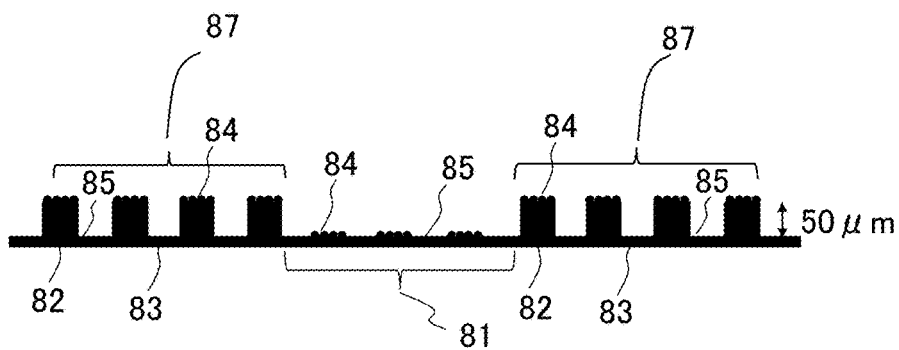
FIG. 8C is a diagram illustrating a structure of a section of the resin component of Example 1.

FIGS. 8A to 8C are diagrams for illustrating a resin component 80 of Example 1. FIG. 8A illustrates a height distribution of an outer surface of the resin component 80, FIG. 8B illustrates a glossiness distribution of the outer surface of the resin component 80, and FIG. 8C illustrates a shape of a cross section in the vicinity of the outer surface of the resin component 80.

In Example 1, as illustrated in FIG. 8B, a checked design pattern in which glossy portions 85 and nonglossy portions 84 are arranged was formed on the resin component 80. The thickness of the resin component 80 was set at 1.6 mm, as an example. As illustrated in FIG. 8B, the pitch of the checked pattern was set at 7 mm, and the checked pattern was formed continuously in a first area 81 and a second area 87. As illustrated in FIG. 8C, in the second area 87, the difference in height between a convex portion 82 (nonglossy portion 84) and a flat portion 83 (glossy portion 85), which are adjacent to each other, was set at 50 µm. The difference in height can produce an optically large contrast, but is not suitable for the process to give a logo or the like. In the first area 81 which is formed in a center portion, and to which the process to give a logo or the like is performed in a post-process, the difference in height between the nonglossy portion 84 and the glossy portion 85, that is, the height of the fine concave-and-convex structure of the nonglossy portion 84 with respect to the flat surface of the glossy portion 85 was set at 5 to 15 µm. The difference in height was determined so as not to affect the process to give the logo to the first area 81.

As illustrated in FIG. 8B, the checked design pattern is a glossiness pattern in which the nonglossy portions 84 (with a glossiness value of 30) and the glossy portions 85 (with a glossiness value of 80) are arranged. In FIG. 8C, in the second area 87, the convex portions 82 correspond to the nonglossy portions 84, and the flat portions 83 correspond to the glossy portions 85. On the top surface of each convex portion 82, which is a nonglossy portion 84, a fine concave-and-convex structure having a height of 5 µm was formed so that the glossiness value was set at 30. The glossy portion 85 was formed as a flat surface on which the fine concave-and-convex structure was not formed, so that the glossiness value was set at 80. Note that in FIG. 8A that illustrates the height distribution, the checked pattern in the first area is not illustrated for convenience of illustration although the checked glossiness pattern, constituted by the nonglossy portions 84 and the glossy portions 85, was formed also in the first area 81 as described above.

The material of the mold used to mold the resin component 80 described with reference to FIGS. 8A to 8C, was stainless steel. First, the radius end mill was fixed to the machining center of FIG. 5 and the mold was roughly machined as described above, and then the surface of the mold was ground into a mirror surface by using the rotary grinder and diamond paste. Then, for forming the checked pattern constituted by the nonglossy portions 84 and the glossy portions 85, an inverted shape for forming the convex portions 82, the fine concave-and-convex structure, and the flat portions 83 was formed in the mold by using the ball end mill as illustrated in FIGS. 6 to 7. After that, injection molding was performed by using the manufactured mold, for obtaining the resin component 80. Note that the resin material used was a black HIPS, as an example.

After that, a process was performed for giving a logo or the like to the first area 81 of the resin component. Since the difference in height between the nonglossy portions 84 and the glossy portions 85 was set at a small value in a range from 5 to 15 µm, the process was able to be performed stably.

Then, the outer surface of the resin component 80 obtained in the present example was visually observed by a person with the normal eyesight, for evaluating whether the person can perceive any discontinuity (gap) of the design pattern in the boundary between the first area and the second area. As a result, although the results varied depending on angles at which the resin component was observed, it was confirmed that the boundary between the second area 87 and the first area 81 is inconspicuous. This is because the checked pattern as illustrated in FIG. 8B is kept across the whole of the outer surface of the resin component 80. In particular, it was confirmed that a visible gap and uncomfortable feeling for the boundary is significantly suppressed compared to a conventional resin component as illustrated in FIG. 2A, in which no glossiness pattern is formed in the first area.

Example 2

Figure 9A:
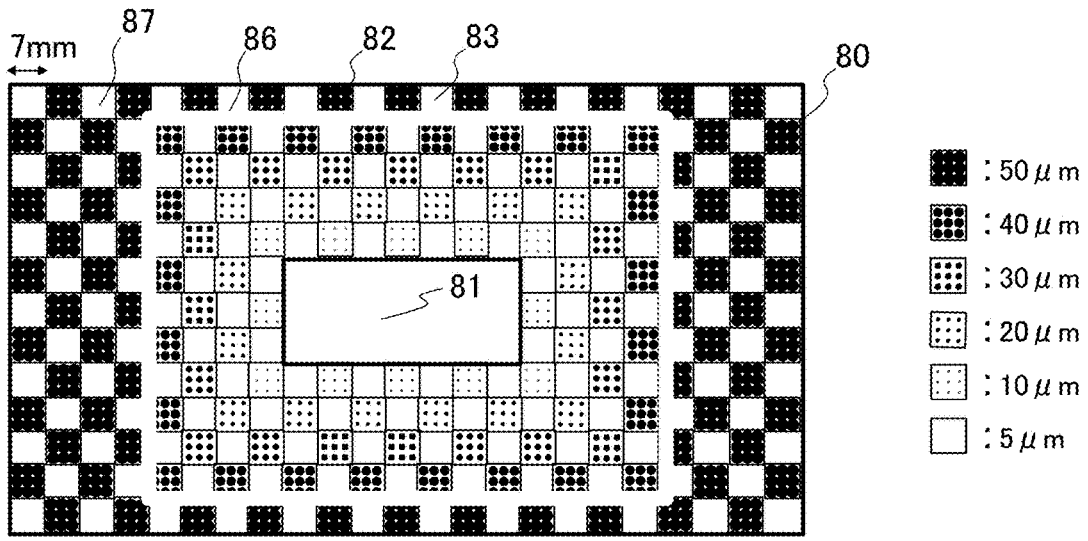
FIG. 9A is a diagram illustrating a structure of a surface of a resin component of Example 2.
Figure 9B:
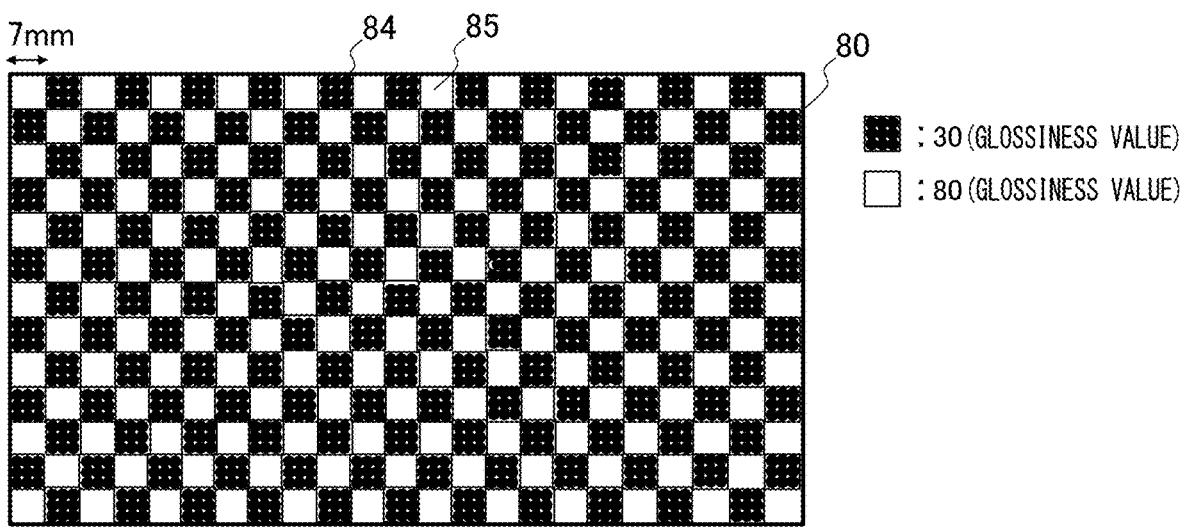
FIG. 9B is a diagram illustrating an optical property of the surface of the resin component of Example 2.
Figure 9C:
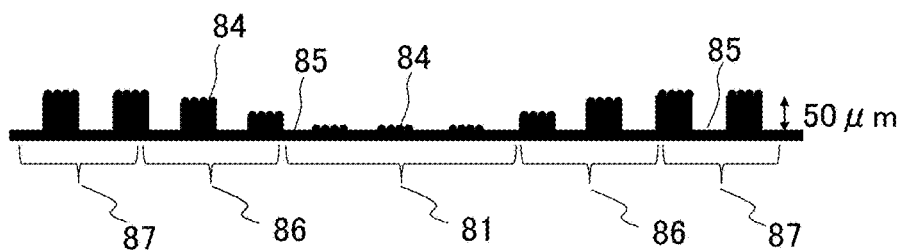
FIG. 9C is a diagram illustrating a structure of a section of the resin component of Example 2.

FIGS. 9A to 9C are diagrams for illustrating a resin component 80 of Example 2. FIG. 9A illustrates a height distribution of an outer surface of the resin component 80, FIG. 9B illustrates a glossiness distribution of the outer surface of the resin component 80, and FIG. 9C illustrates a shape of a cross section in the vicinity of the outer surface of the resin component 80.

As illustrated in FIG. 9B, the size and the pitch of a checked pattern of the present example are the same as those of Example 1 illustrated in FIG. 8B. Example 2 differs from Example 1 in that a transition area 86 is formed between the first area 81 formed in a center portion and the second area 87 formed in a peripheral portion. As illustrated in FIG. 9A, in the transition area 86, the height of the convex portions 82 decreases monotonously as the transition area 86 extends in a direction from the second area 87 toward the first area 81.

Specifically, the transition area 86 was set at 28 mm (that is equivalent to four pitches of the checked pattern) in a longitudinal direction and in a lateral direction, and the height of the convex portions 82 was decreased by 10 μm every time the transition area 86 extends by 7 mm (that is equivalent to one pitch) in a direction from the second area 87 toward the first area 81. In the first area 81, the difference in height between the nonglossy portions 84 and the glossy portions 85 was set at 5 μm so as not to affect the process to give a logo or the like to the first area 81. The difference in height is equal to the height of the fine concave-and-convex structure of the nonglossy portion 84 with respect to the flat surface of the glossy portion 85. In the glossiness pattern, the convex portion or the fine concave-and-convex structure corresponds to the nonglossy portion 84, and the flat portion 83 corresponds to the glossy portion 85. The glossiness value of the nonglossy portion 84 was 30, and the glossiness value of the glossy portion was 80. As illustrated in FIG. 9B, the glossiness pattern constituted by the nonglossy portions 84 and the glossy portions 85 was formed across the whole of the surface including the first area 81 and the transition area 86. A height structure in a side view, of the resin component including the first area 81, the second area 87, and the transition area 86 is illustrated in FIG. 9C. Note that in FIG. 9A that illustrates the height distribution, the checked pattern in the first area is not illustrated for convenience of illustration although the checked glossiness pattern, constituted by the nonglossy portions 84 and the glossy portions 85, was formed also in the first area 81 as described above.

The material of the mold was stainless steel. First, the radius end mill was fixed to the machining center of FIG. 5 and the mold was roughly machined as described above, and then the surface of the mold was ground into a mirror surface by using the rotary grinder and diamond paste. Then, for forming the checked pattern constituted by the nonglossy portions 84 and the glossy portions 85, an inverted shape for forming the convex portions, the fine concave-and-convex structure, and the flat portions was formed in the mold by using the ball end mill as illustrated in FIGS. 6A, 6B, 7A, and 7B. After that, injection molding was performed by using the manufactured mold, for obtaining the resin component 80. Note that the resin material used was a black HIPS, as an example.

After that, a process was performed for giving a logo or the like to the first area 81 of the resin component. Since the difference in height between the nonglossy portions 84 and the glossy portions 85 was set at a small value of 5 μm, the process was able to be performed stably.

Then, the outer surface of the resin component 80 obtained in the present example was visually observed by a person with the normal eyesight, for evaluating whether the person can perceive any discontinuity (gap) of the design pattern in the boundary between the first area and the second area. As a result, although the results varied depending on angles at which the resin component was observed, the glossiness pattern as illustrated in FIG. 9B was kept across the whole of the outer surface of the resin component 80. In addition, it was confirmed that the boundary is more inconspicuous than the boundary in Example 1. This is because the height of the convex portions is changed step by step in a direction from the second area 87 toward the first area 81.

Example 3

In Example 2, the transition area 86 was formed between the first area 81 formed in a center portion and the second area 87 formed in a peripheral portion. In the transition area 86, as illustrated in FIG. 9A, the height of the convex portions 82 decreases monotonously as the transition area 86 extends in a direction from the second area 87 toward the first area 81. Specifically, the transition area 86 was set at 28 mm (that is equivalent to four pitches of the checked pattern) in a longitudinal direction and in a lateral direction, and the height of the convex portions 82 was decreased by 10 μm every time the transition area 86 extends by 7 mm (that is equivalent to one pitch) in a direction from the second area 87 toward the first area 81.

In Example 3, like a so-called hairline pattern, a width of each concave or convex portion is small, and if the height between convex portions and concave portions is changed, the glossiness intensity changes accordingly.

Figure 10A:
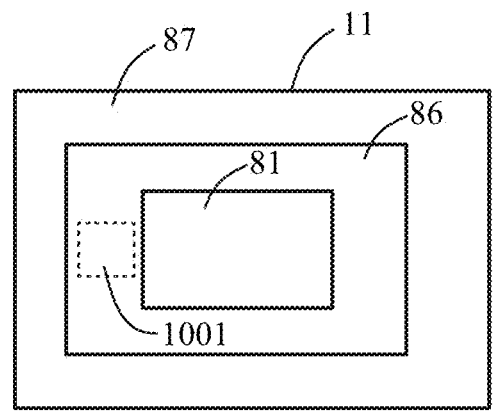
FIG. 10A is a plan view of the whole of a resin component of Example 2.
Figure 10B:
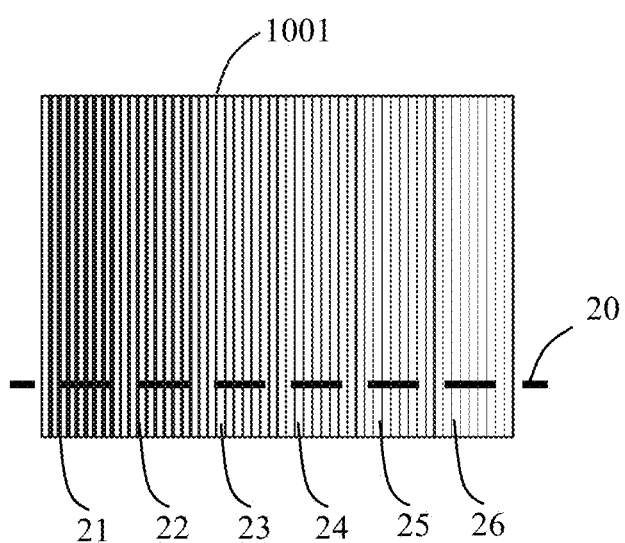
FIG. 10B is a diagram illustrating a structure of a surface of the resin component of Example 2.

First, with reference to FIGS. 10A to 10D, an example of a structure of an outer surface 11 of a document cover will be described. FIG. 10A illustrates the whole of the outer surface 11. As in Example 2, the outer surface 11 includes a first area 81, a second area 87 formed in a periphery of the first area 81, and a transition area 86 formed between the first area 81 and the second area 87. In the whole of the second area 87, a hairline concave-and-convex structure having a predetermined height is formed. In the transition area 86, six hairline areas having different heights between concave and convex portions are formed, and the height between concave and convex portions gradually decreases as the transition area 86 extends from the second area 87 toward the first area 81. FIG. 10B illustrates six hairline areas 21 to 26 formed in a local area 1001 of the transition area 86 and having different heights between concave and convex portions.

Figure 10C:
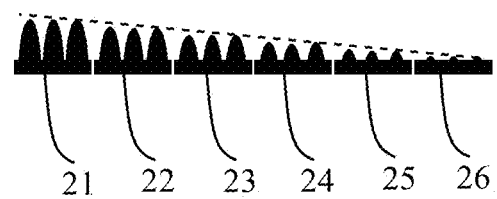
FIG. 10C is a diagram illustrating a structure of a section of the resin component of Example 2.
Figure 10D:
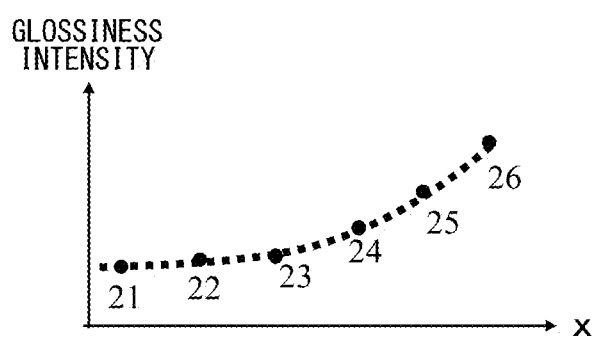
FIG. 10D is a diagram illustrating an optical property of the surface of the resin component of Example 2.

As described above, in the hairline pattern in which a width of each concave or convex portion is small, the glossiness intensity changes in accordance with the height between concave and convex portions. Thus, in the present example, the glossiness intensity of the areas 21 to 26 also changes gradually. FIG. 10C illustrates a cross section of the areas 21 to 26 of the transition area 86, and FIG. 10D illustrates a glossiness value distribution of the areas 21 to 26.

As illustrated in FIG. 10C, the difference in height between concave and convex portions of the rough surface formed on the outer surface 11 is decreased almost linearly (for example, in accordance with a linear function) in the order of the area 21 the area 26, in consideration of easiness of controlling the machining. Note that the resolution of concave and convex portions of the rough surface formed on the outer surface 11 may be defined as the number of convex portions (concave portions) formed per one inch, and that the number of convex portions (concave portions) is 30 (the width of one convex or concave portion is about 420 μm).

In addition, the resolution is almost constant in the areas 21 to 26.

In a case where the width of each concave or convex portion is less than 1mm as in this example, when the height between concave and convex portions is changed, the glossiness of a macro area in which a group of the concave and convex portions is formed changes. That is, if the height between concave and convex portions is changed step by step in the areas 21 to 26, the glossiness value of the areas 21 to 26 changes step by step. For example, if the glossiness value is measured by using a glossmeter that measures a 60° specular glossiness (JIS Z 8741), the glossiness value of the areas 21 to 26 often changes nonlinearly as illustrated in FIG. 10D. That is, in the example illustrated in FIGS. 10A to 10D, although the difference in height between concave and convex portions of the rough surface formed on the outer surface 11 changes linearly (in accordance with a linear function), the glossiness value changes nonlinearly. Note that in FIG. 10B, the difference in height between concave and convex portions of the rough surface decreases in a direction from the left deep-color area 21 toward the right light-color or white-color area 26. In such a structure, bottom surfaces of the concave and convex portions that are flat portions are more exposed as the bottom surfaces are located farther from the left deep-color area 21 and closer to the right light-color or white-color area 26. Thus, the light reflected off from the bottom surfaces increases, and is perceived by an observer as larger glossiness.

However, if the glossiness changes nonlinearly on the outer surface 11 of the resin component in a direction from the second area toward the first area in which a logo or the like id to be formed, an observer may not sufficiently perceive the effect in design, in terms of smoothness. Note that the width of each of the areas 21 to 26 of the rough surface formed on the outer surface 11 (that is, a size of each of the areas in an arrangement direction that is a right-left direction in FIG. 10B) is at least larger than about 10 mm. If the width of each of the areas 21 to 26 of the rough surface formed on the outer surface 11 is less than about 10 mm, observers will hardly identify the difference in height of a rough surface of each area, even if they compare the difference in height of one area with the difference in height of an adjacent area.

Figure 11A:
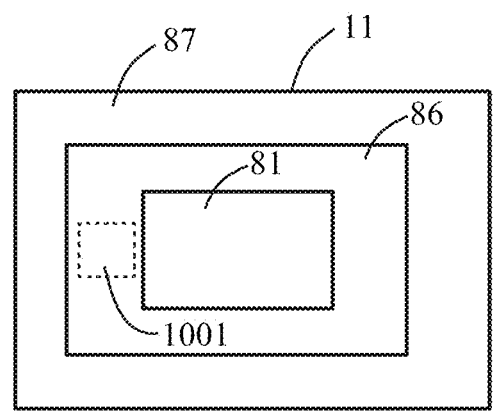
FIG. 11A is a plan view of the whole of a resin component of Example 3.
Figure 11B:
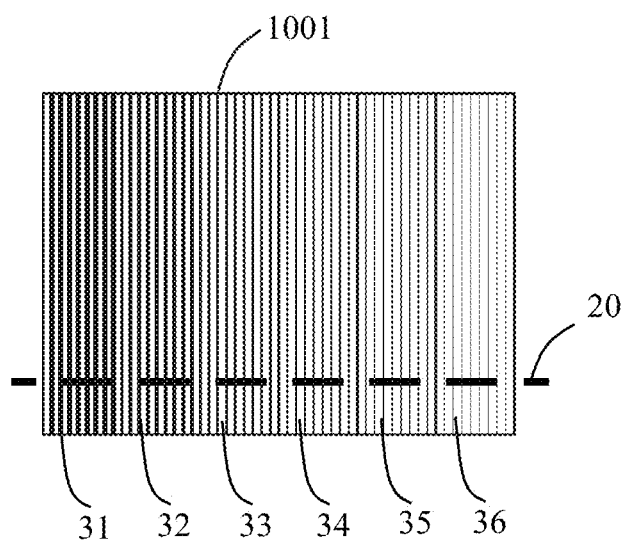
FIG. 11B is a diagram illustrating a structure of a surface of the resin component of Example 3.
Figure 11C:
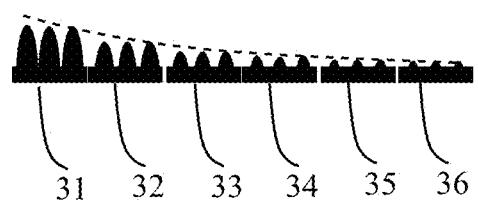
FIG. 11C is a diagram illustrating a structure of a section of the resin component of Example 3.
Figure 11D:
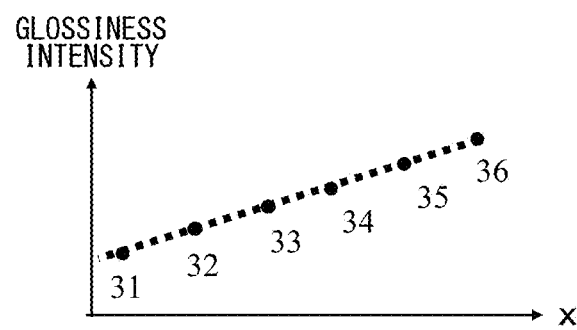
FIG. 11D is a diagram illustrating an optical property of the surface of the resin component of Example 3.

FIGS. 11A to 11D are diagrams for illustrating a resin component of Example 3. The forms of FIGS. 11A to 11D are the same as those of FIGS. 10A to 10D. FIG. 11A illustrates the whole of the outer surface 11. FIG. 11B illustrates six hairline areas 31 to 36 formed in a local area 1001 of a transition area 86 and having different heights between concave and convex portions. As illustrated in FIG. 11D, the glossiness value of the areas 31 to 36 changes linearly in a direction from the area 31 toward the area 36. Thus, the height of the hairline concave-and-convex structure, which forms the areas 31 to 36, changes nonlinearly in the direction from the area 31 toward the area 36.

Note that as in FIG. 9C, the glossiness intensity represented by the vertical axis of the graph of FIG. 11D was measured by using a glossmeter, which is designed to measure a specular glossiness at a reflection angle of 60 under JIS Z 8741. For example, the measurement values on glossiness can be obtained by using a certain glossmeter, such as a handy type gloss meter PG-1 (product name) made by NIPPON DENSHOKU INDUSTRIES CO. LTD. Specifically, the measurement values on glossiness can be obtained by setting the reflection angle at 60°, and pressing a measurement switch in a state where a photometer of the glossmeter is pressed against a glossy portion of the molded product.

Thus, the resin component of Example 3 is molded such that the glossiness value changes uniformly (linearly) in the direction from the second area toward the first area in which a logo or the like is to be formed. Note that in FIG. 11C, the width of each of the areas 31 to 36 (glossy portion) that are rough surfaces having different differences in height (that is, a size of each of the areas in an arrangement direction of the areas that is a right-left direction in FIG. 11C) is at least larger than 10 mm. In addition, it is preferable that the widths of the areas be made almost equal so that the change in glossiness value of the areas perceived by observers becomes as uniform as possible.

As described above, in the resin component of Example 3, the height of the convex portions of each area with respect to the flat portions is determined such that the glossiness value of the transition area changes linearly. In such a resin component, since the glossiness intensity changes linearly in a direction from the first area to the second area of the outer surface 11, the discontinuity (gap) of the design pattern can be reduced.

Note that the material of resin components manufactured by using a mold may be a resin, such as ABS or HIPS (high impact polystyrene), but the type of the resin is not intended to limit the present invention.

Method of Manufacturing Injection Molding Mold

The resin component of the present example has a plurality of areas formed on a surface of the resin component and having rough surfaces with different differences in height between concave and convex portions. The resin component is formed through injection molding that uses a mold. When the injection molding mold used for the purpose is manufactured, a size of a cutting portion of a cutting tool used to form rough surfaces on the mold surface and a glossiness value given to a certain area of the plurality of areas by the mold are used to control depth of cut of the mold. That is, the depth of cut performed by the cutting tool when a mold surface corresponding to the certain area is cut is controlled in accordance with the size of the cutting portion and the glossiness value given to the certain area. More specifically, the below-described control for machining the mold uses glossiness control information (glossiness map information) in which the size of the cutting portion, the cutting resolution by the cutting tool, and the glossiness value of the outer surface of the resin component produced by cutting the mold are associated with each other.

The injection molding mold in Example 3 is manufactured by using the machining center illustrated in FIG. 5 and described in the first embodiment. Since the first mold-machining process described with reference to FIG. 6A and the second mold-machining process as described with reference to FIG. 6B are the same as those of the first embodiment, the description thereof will be omitted.

Figure 12A:
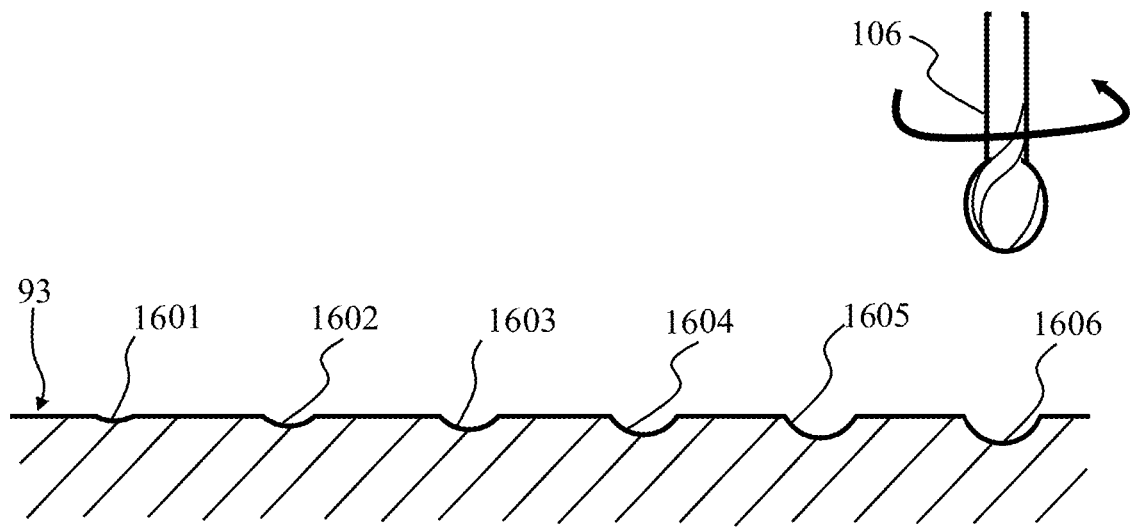
FIG. 12A is a diagram illustrating a machining process for a mold used in Example 3.
Figure 12B:
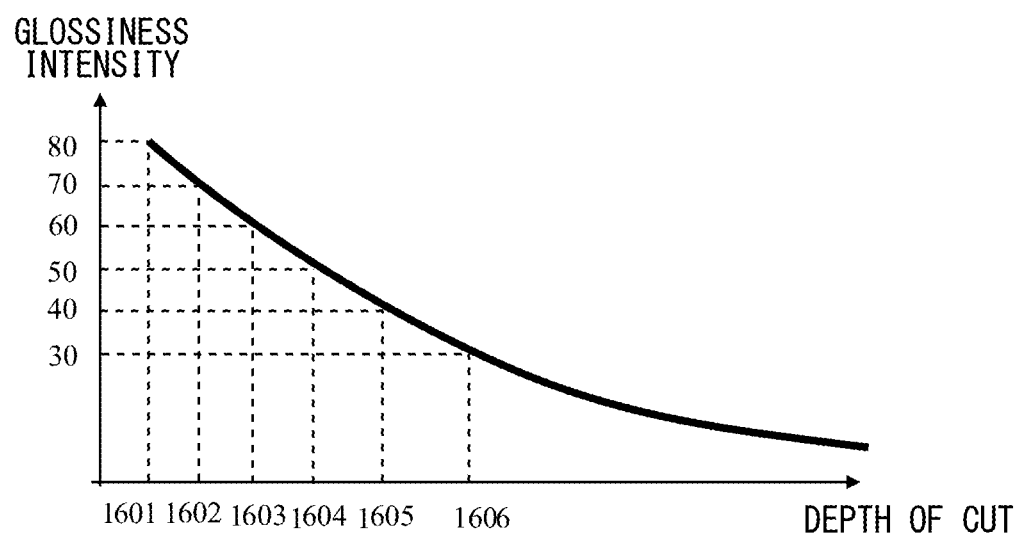
FIG. 12B is a diagram illustrating a relationship between the depth of cut of the mold and the glossiness intensity of a resin component.

FIG. 12A illustrates a third machining process to manufacture a mold 93 of Example 3, and FIG. 12B illustrates a relationship between the cut of depth and the glossiness value in the third machining process.

As illustrated in FIG. 12A, in the third machining process, the ball end mill 106 is used as a cutting tool, and a surface 101 of the mold 93 is cut for forming concave portions that are to be transferred to the resin component as convex portions. In the third machining process, the surface 101 of the mold 93 is cut and scanned while the ball end mill 106 is rotated, so that concave portions 1601 to 1606 are formed. The concave portions 1601 to 1606 respectively correspond to convex portions formed in the areas 36 to 31 of the resin component. Note that FIG. 12A illustrates only one concave portion in each area for simplifying illustration. The concave portions have different depth, and are to be transferred to the resin component for forming convex portions of the areas 31 to 36. In practice, however, each of the concave portions 1601 to 1606 is constituted by many concave portions formed in a corresponding area at a predetermined resolution.

The material of the mold 93, which is to be machined as described above, is preferably stainless steel for the machinability and durability required in injection molding, but may be another material, such as brass or steel.

In the following description, an example of a method of determining the amount of movement of the cutting tool (e.g. ball end mill 106) in the Z direction in the above-described third machining process, that is, an example of a method of determining the depth of cut of the concave portions 1601 to 1606 will be described. The depth of cut of concave portions of each area is determined, associated with the glossiness given to a corresponding area of the outer surface 11 of the resin component.

Example 1 of Manufacturing Mold

Figure 13:
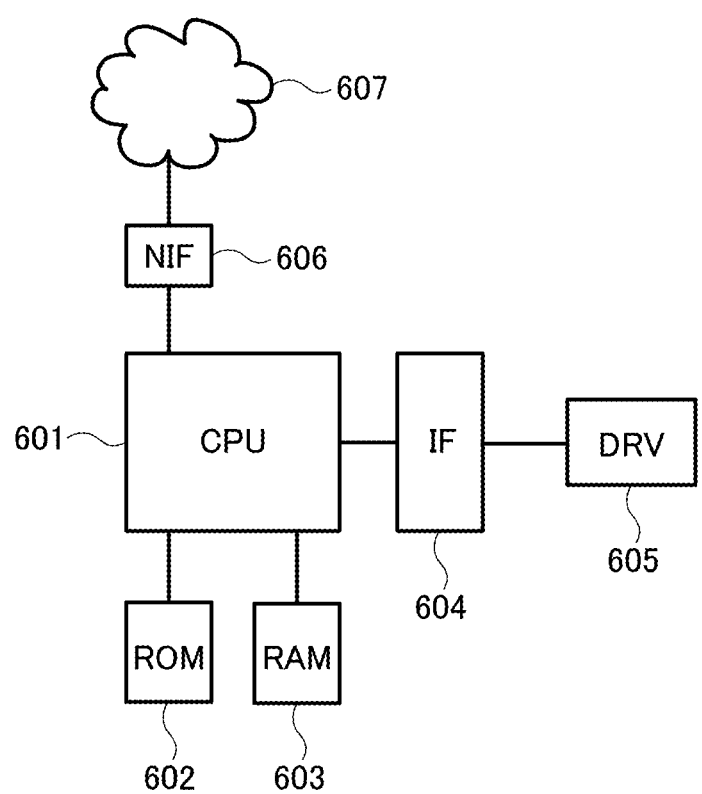
FIG. 13 is a block diagram of a control system of a manufacturing apparatus used for the mold.

In Example 1 of manufacturing the mold, a Z-direction-movement-amount determination process performed in the machining center of FIG. 5 depending on the NC data 99 is executed by a control system and a control program. The control system constitutes a control device 92 and mainly includes a CPU, and the control program is a program to control the control system. FIG. 13 illustrates an example of a specific configuration of the control device 92 of FIG. 5.

The control system of FIG. 13 includes a CPU 601 serving as a main control means, a ROM 602 serving as a storage device, and a RAM 603. The ROM 602 can store the control program, information on constants, and the like. The control program is used for the CPU 601 to achieve later-described manufacturing procedures. The above-described NC data 99 (FIG. 4) and a table data, especially such as a later-described glossiness map, can be stored in the ROM 602. The RAM 603 is used as a work area used by the CPU 601 when the CPU 601 executes the control procedures. Note that the control program of the CPU 601 for achieving the later-described control procedures may be stored in an external storage device, such as an HDD or an SSD (both not illustrated), or a storage portion (e.g. EEPROM area) of the ROM 602.

In this case, the control program of the CPU 601, which achieves the later-described control procedures, can be supplied to the above-described storage portion via a network interface 606 for example; and can be updated with a new (another) program. The network interface 606 used to communicate via a network 607 may operate on communication standards on wire communications, such as IEEE 802.3, or on communication standards on wireless communication, such as IEEE 802.11 or 802.15.

Alternatively, the control program of the CPU 601, which achieves the later-described control procedures, may be supplied to the above-described storage portion via a storage means, such as one of various magnetic disks, an optical disk, or a flash memory, and a driving device that drives the storage means; and may be updated. The storage means or the storage portion that stores the control program of the CPU 601, which achieves the later-described control procedures, is a computer-readable storage medium that stores the control procedures for implementing the present invention. In addition, although not essential, a UI device (user interface device) may be connected to the control system of FIG. 13. The UI interface may be a terminal such as a handy terminal, or a device such as a keyboard, a display, a jog dial, or a pointing device (or a control terminal including those devices).

Driving portions for the cutting tool 94 of the machine body 91 of FIG. 5, such as the spindle 95, the X stage 96, the Y stage 97, and the Z stage 98, are controlled via a driver 605 of FIG. 13. For example, the CPU 601 controls the above-described portions of the machine body 91 by changing driving control data given to the driver 605 via the interface 604. The CPU 601 determines and controls the number of rotations of the cutting tool 94 (e.g. ball end mill illustrated in FIG. 6A) and the amount of movement of the cutting tool 94 in the Z direction, that is, the depth of cut of the concave portions 1601 to 1606.

Figure 14:
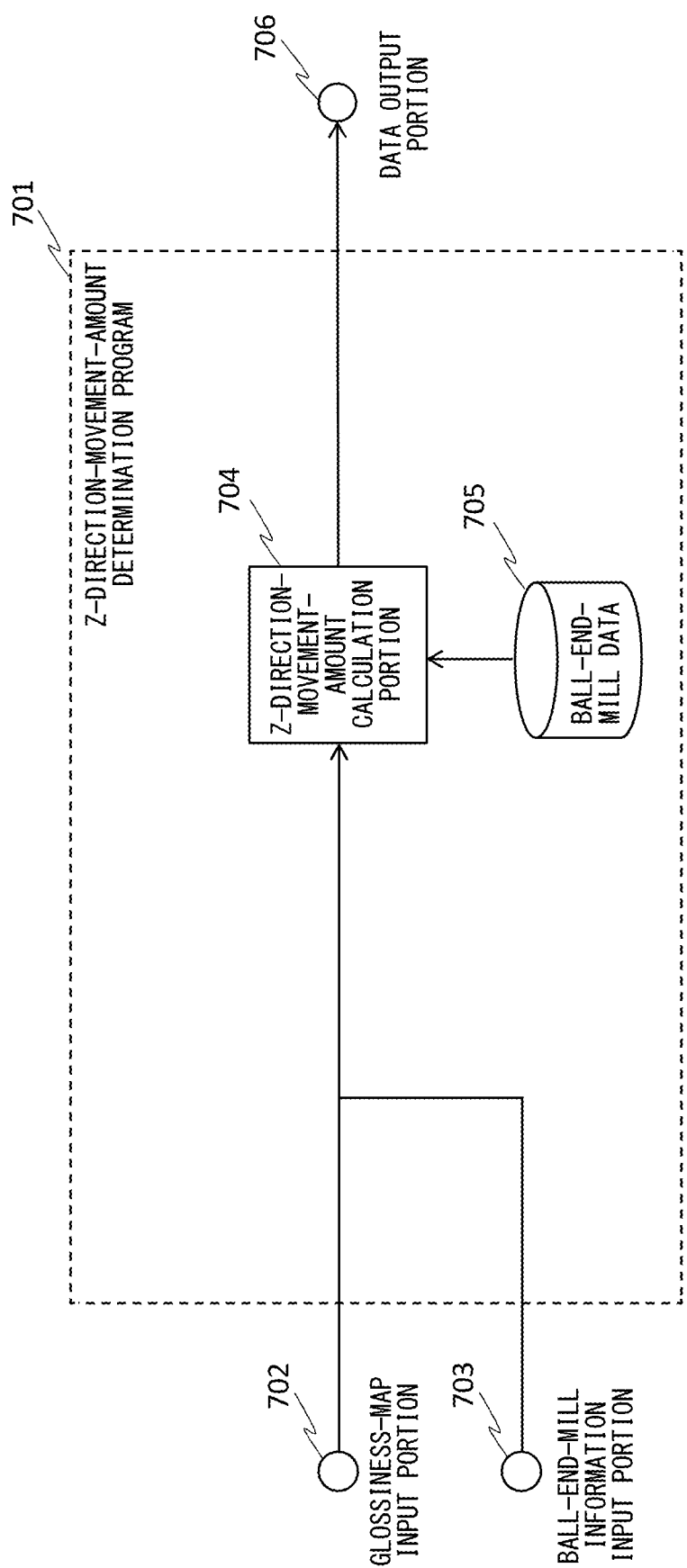
FIG. 14 is a block diagram of the control system of the manufacturing apparatus used for the mold.

FIG. 14 illustrates a functional configuration of the control device 92 configured as in FIG. 13. The functional block of FIG. 14 is achieved by software executed by the CPU 601 on the hardware of the control system of FIG. 13. For example, the functional block is executed by a movement-amount determination program 701 that determines the amount of movement of the cutting tool 94 in the Z direction.

In FIG. 14, the movement-amount determination program 701 includes a glossiness-map input portion 702, a ball-end-mill information input portion 703, a movement-amount calculation portion 704, a ball end mill database 705, and a data output portion 706.

Figure 15:
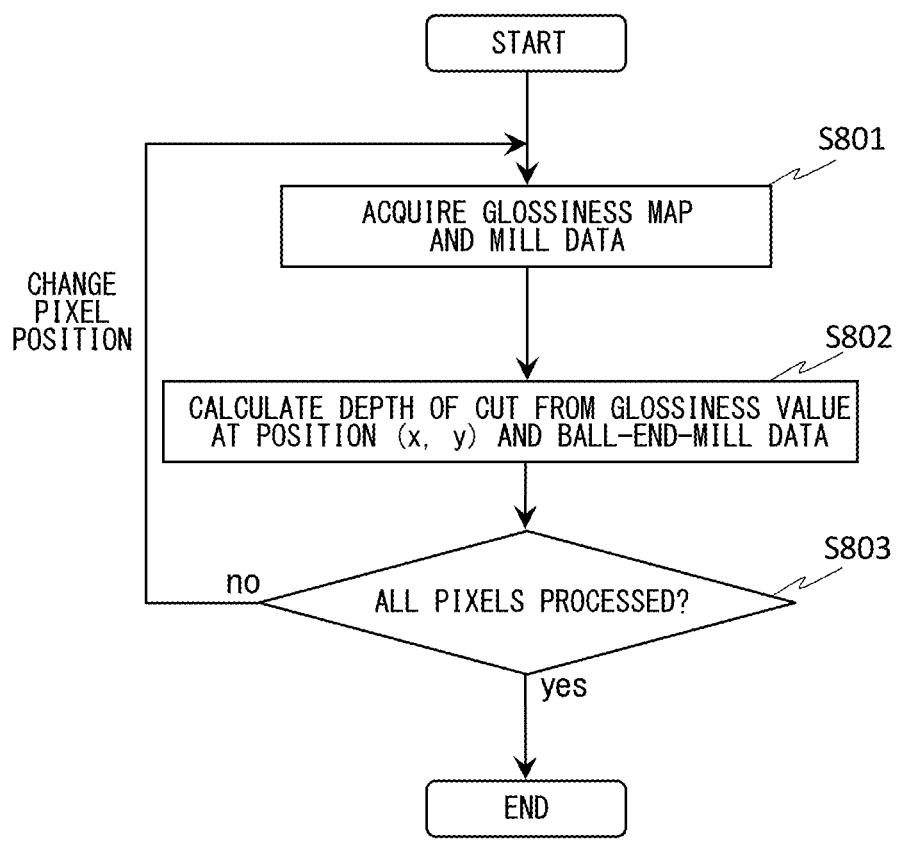
FIG. 15 is a flowchart illustrating procedures for controlling the manufacturing apparatus used for the mold.

Hereinafter, an operation of the movement-amount determination program 701 of FIG. 14 will be described with reference to the flowchart of FIG. 15. The control procedures of FIG. 15 are processes to create a depth-of-cut map that is outputted via the data output portion (depth-of-cut map output portion) 706, to control the machine body 91. The depth-of-cut map has information on a depth of cut in the Z direction, which is set at a corresponding pixel position of a glossiness map 9 of FIG. 16. The function of the data output portion 706 corresponds to the function of the interface 604 and the driver 605 of FIG. 13, as an example. In the actual cutting control, the CPU 601 reads information on a depth of cut in the Z direction, which is set at a corresponding pixel position, depending on a value stored in the depth-of-cut map created in the procedures of FIG. 15. Then the CPU 601 produces driving information for controlling each portion of the machine body 91 by using the depth of cut, and outputs the driving information to each portion of the machine body 91 via the interface 604 and the driver 605.

In the loop of Step S801 to Step S803 of FIG. 15, the CPU 601 two-dimensionally scans the glossiness map 9, and calculates a depth of cut for each pixel, from a corresponding glossiness value. In Step S801, the CPU 601 obtains the glossiness map 9 from the glossiness map input portion. The glossiness-map input portion 702 has a function that reads a glossiness map as illustrated in FIG. 16, from the ROM 602 of FIG. 13, an external storage device (not illustrated), or a server on the network 607, and loads the glossiness map to the movement-amount determination program 701.

Figure 16:
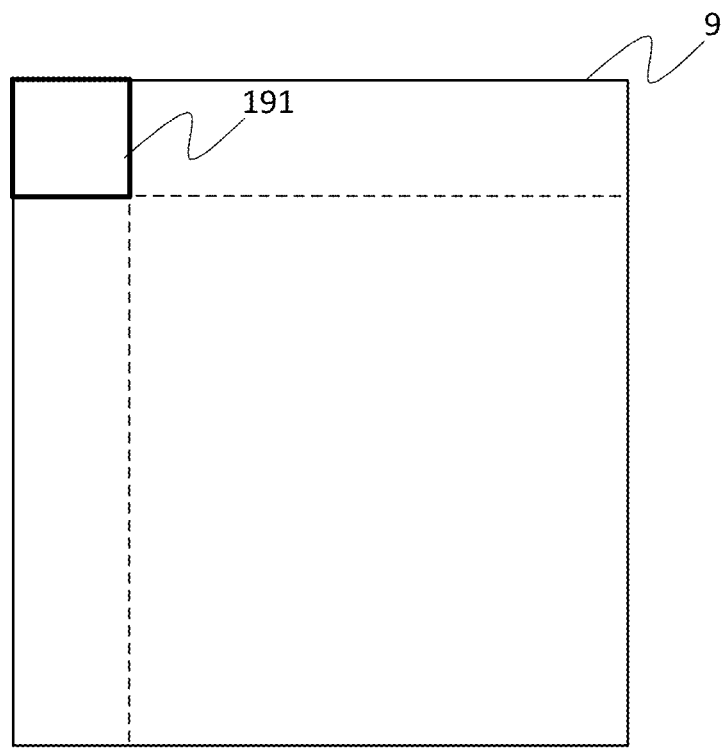
FIG. 16 is a diagram illustrating one example of a glossiness map.

The glossiness map 9 of FIG. 16 may be image data, and may be formed in a data format similar to the bit map. The glossiness map 9 contains many pixels 191, as elements, each corresponding to a certain position of the outer surface 11 of the resin component. For example, a pixel 191 has glossiness data that is represented by using 8 bits and has a value from 0 to 100. The glossiness map 9 has data produced in accordance with the design of the outer surface of a certain resin component molded by using the mold 93, in particular, in accordance with a glossiness value distribution of each of the areas (31 to 36, . . . ) of the outer surface of the resin component. That is, the glossiness value of each pixel 191 is determined in design in accordance with the glossiness value given to a corresponding position of the outer surface 11 of the resin component molded by using the mold 93. Note that in FIG. 16, although the glossiness map 9 is a two-dimensional map having a rectangular area for simplification, the glossiness map 9 in a practical use has a data configuration determined in accordance with the shape of an outer surface of a certain resin component.

In Step S802 of FIG. 15, the movement-amount calculation portion 704 calculates a depth of cut at a pixel position (x, y) of the glossiness map 9 in accordance with a glossiness value given to the pixel position (x, y). In this step, the movement-amount calculation portion 704 uses the ball-end-mill data that is cutting tool information, performs interpolation if necessary, and calculates the depth of cut at the pixel position (x, y).

FIG. 17 illustrates one example of the ball-end-mill data, which is cutting tool information. The cutting tool information (ball-end-mill data) of FIG. 17 contains glossiness value associated with the depth of cut performed by a cutting tool. The glossiness value is also associated with the resolution of concave portions formed by cutting a mold, and with the bit diameter of the cutting tool. The ball-end-mill data, which is cutting tool information, is created in advance by using a ball end mill having various bit diameters and conducting an experiment. In the experiment, a mold is cut so as to have various depths, a resin component is molded through injection molding, and a glossiness value of an outer surface of the resin component is measured by using a glossmeter.

Note that in FIG. 17, although values in a range between 100 and 1200 dpi are not illustrated, it is preferable that the values be stored in this range, in accordance with a resolution and a cutting tool that would be used in a mold manufacturing process. In addition, although FIG. 17 indicates only the values in the depth of cut of 0.005 (5 μm), 0.02 (20 μm), 0.05 (50 μm), 0.1 (100 μm), 0.2 (200 μm), it is preferable that other data be stored by performing the measurement on a depth of cut that would be used in a mold manufacturing process. In addition, for a case where the CPU 601 cannot find data, in the tool information of FIG. 17, that corresponds to a certain depth of cut, the CPU 601 can calculate an approximate value from an appropriate data range, or calculate a desired depth-of-cut value by performing interpolation.

In Step S803 of FIG. 15, the CPU 601 determines whether the CPU 601 has calculated the depth of cut for all the pixel positions of the glossiness map 9. If the CPU 601 determines that the CPU 601 has calculated the depth of cut for all the pixel positions, then the CPU 601 ends the depth-of-cut map creation process of FIG. 15. If the CPU 601 determines that the CPU 601 has not calculated the depth of cut for all the pixel positions, then the CPU 601 changes a pixel position, and returns to Step S801 for repeatedly performing the above-described processes.

By molding the resin component with the mold having a mold surface that is cut in the above-described manner, the areas (31 to 36 . . . ) of the outer surface 11 of the resin component can be given the glossiness (glossiness value distribution: glossiness pattern) that changes linearly, as illustrated in FIG. 11D. For example, suppose that the glossiness map 9 is given, which has a glossiness value distribution (glossiness pattern) as illustrated in FIG. 11D, and which corresponds to the areas (31 to 36 . . . ) of the outer surface 11 of a certain resin component. Through the above-described procedures or processes, the CPU 601 allows the mold surface to be cut, depending on the glossiness map 9 and with reference to the ball-end-mill data that is cutting tool information. In this operation, the mold surface is cut so as to produce a depth-of-cut distribution that can form the difference in height between concave and convex portions of the areas (31 to 36 . . . ) as illustrated in FIG. 11B.

Thus, in the resin component molded with the manufactured mold, the rough surfaces of the plurality of areas 31 to 36 have different differences in height such that the glossiness value of adjacent areas changes linearly in the arrangement direction in which the areas 31 to 36 of the outer surface 11 are arranged. As described above, in such a resin component, the uniformity in the amount of change of glossiness on the outer surface 11 is kept, and the glossiness value changes smoothly in the direction in which the plurality of areas is arranged. Thus, under the control by the first embodiment, a resin component having a new and good design can be provided.

In addition, the design of an electronic device, such as a printer of FIG. 1, including such a resin component as one portion of an exterior component can be significantly improved.

Example 2 of Manufacturing Mold

In Example 1 of manufacturing a mold, the description has been made for a basic method that calculates the depth-of-cut map with reference to the glossiness map 9 of FIG. 16 and the ball-end-mill data of FIG. 17, which is cutting tool information. However, there may be a case in which the specifications including the bit diameter of the ball end mill, which can be made for cutting a mold on various manufacturing conditions, are fixed and cannot be changed. In such a case, a depth of cut to achieve a desired glossiness may not be obtained, for example, due to a relationship between the inputted resolution and the drill diameter of the ball end mill. As countermeasures, in Example 2 of manufacturing a mold, the description will be made for an example of control that reconfigures glossiness values of the glossiness map, which are created under a condition on cutting tools that can be or should be used, the cutting tool information, and a desire from a designer.

In the present example of manufacturing a mold, the control system necessary for the Z-direction-movement-amount determination process performed depending on the NC data 99, and the function and the configuration of the control system are the same as those described with reference to FIGS. 13 and 14. In the present example of manufacturing a mold, the control procedures of the movement-amount determination program 701 may be performed as illustrated in FIG. 18. Similar to the control procedures of FIG. 15, the control procedures of FIG. 18 are processes to create a depth-of-cut map that is outputted via the data output portion 706, to control the machine body 91.

In Step S1101 of the flowchart of FIG. 18, the CPU 601 obtains the glossiness map 9 (FIG. 16) and the ball-end-mill data (FIG. 17), which is cutting tool information, from the glossiness-map input portion 702.

Next, in Step S1102, the CPU 601 obtains a maximum value GMmax and a minimum value GMmin from glossiness values stored in the glossiness map 9. Hereinafter, a maximum glossiness value of the ball-end-mill data (FIG. 17) is denoted by GBmax, a minimum glossiness value of the ball-end-mill data is denoted by GBmin, a corrected maximum glossiness value is denoted by GCmax, and a corrected minimum glossiness value is denoted by GCmin. In addition, an uncorrected glossiness value is denoted by Gin, and a corrected glossiness value is denoted by Gout. As initial values, the CPU 601 sets GMmax to the corrected maximum glossiness value GCmax, and GMmin to the corrected minimum glossiness value GCmin.

In Step S1103, the CPU 601 compares the maximum glossiness value GBmax of the ball-end-mill data and the maximum glossiness value GMmax of the inputted glossiness values.

Then the CPU 601 proceeds to Step S1104 if the maximum glossiness value GMmax of the ball-end-mill data is smaller than the maximum glossiness value GMmax, or proceeds to Step S1105 if not. In Step S1104, the CPU 601 sets the maximum glossiness value GBmax to the corrected maximum glossiness value GCmax.

In Step S1105, the CPU 601 compares the minimum glossiness value GBmin of the ball-end-mill data and the minimum glossiness value GMmin of the inputted glossiness values.

Then the CPU 601 proceeds to Step S1106 if the minimum glossiness value GMmin of the ball-end-mill data is larger than the minimum glossiness value GMmin, or proceeds to Step S1107 if not. In Step S1106, the CPU 601 sets the minimum glossiness value GBmin to the corrected minimum glossiness value GCmin.

In the loop of Step S1107 to Step S1109, the CPU 601 two-dimensionally scans the glossiness map 9, and calculates a depth of cut of each pixel from a corresponding glossiness value. First, in Step S1107, the CPU 601 uses an equation (1), and corrects and converts an inputted glossiness value of a pixel.

$$G_{out} = (Gin - GM\min) \times \frac{GC_{max} - GC\min}{GM_{max} - GM\min} + GC_{min} \quad (1)$$

The equation (1) changes a range between the maximum glossiness value and the minimum glossiness value of the glossiness map 9 in accordance with the maximum glossiness value and the minimum glossiness value obtained from the cutting tool, and corrects the glossiness value information of a certain pixel in accordance with a scaling factor. In Step S1108, the CPU 601 calculates a depth of cut by using a glossiness value obtained at a pixel position (x, y) and corrected in Step S1107 and the ball-end-mill data, and by performing interpolation.

In Step S1109, the CPU 601 determines whether the CPU 601 has calculated the depth of cut for all the pixel positions of the glossiness map 9. If the CPU 601 determines that the CPU 601 has calculated the depth of cut for all the pixel positions, then the CPU 601 ends the depth-of-cut map creation process of FIG. 18. If the CPU 601 determines that the CPU 601 has not calculated the depth of cut for all the pixel positions, then the CPU 601 changes a pixel position, and returns to Step S1107 for repeatedly performing the above-described processes.

In the above-described manner, the CPU 601 corrects the glossiness value of each pixel of the glossiness map 9 in accordance with the maximum glossiness value and the minimum glossiness value obtained from the cutting tool, and creates a depth-of-cut map that contains depth-of-cut values from which the corrected glossiness values can be obtained. Thus, the CPU 601 compresses the range of glossiness values of the glossiness map 9, depending on the limitation of a cutting tool to be used; and can create the depth-of-cut map that contains depth-of-cut values and provides a glossiness value distribution (glossiness pattern) that the cutting tool can handle.

For example, it can be prevented that the range of glossiness value of the glossiness map 9 becomes larger than the range of glossiness value limited by a cutting tool, and that the glossiness value reaches a maximum/minimum value inside an edge portion of the outer surface of a resin component in which the areas (31 to 36) are formed by the mold that has been cut. Thus, it is possible to manufacture the mold that can give a glossiness value distribution to the outer surface of the resin component within a range of glossiness value that the cutting tool can handle. The glossiness value distribution is made similar to the whole impression of the glossiness value distribution of the glossiness map 9.

Figure 19A:
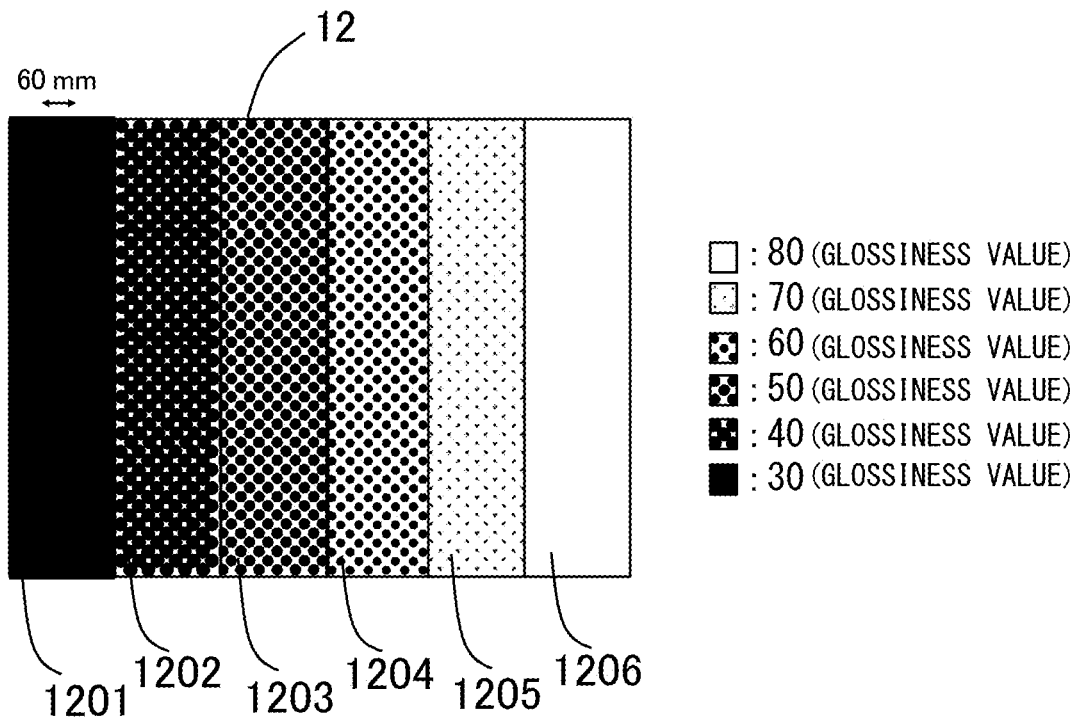
FIG. 19A is a diagram illustrating an optical property of a surface of an electronic device of Example 3.
Figure 19B:
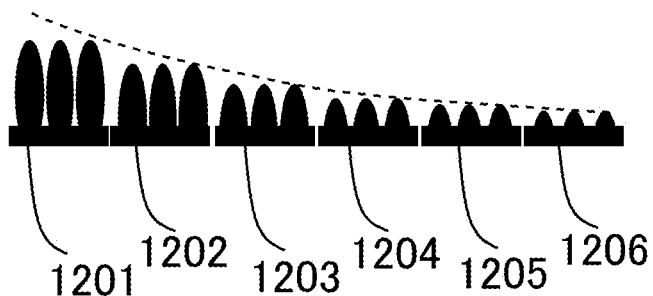
FIG. 19B is a diagram illustrating a structure of a section of the electronic device of Example 3.

FIGS. 19A and 19B illustrate one example of a resin component molded with a mold manufactured by the above-described mold machining control. On the outer surface of the resin component used as the document cover 12, areas 1201 to 1206 that correspond to the areas 31 to 36 of the outer surface 11 of the resin component of FIG. 11A are disposed. FIG. 19A illustrates a glossiness distribution of the areas 1201 to 1206. FIG. 19B illustrates side surfaces of the areas 1201 to 1206 so that the difference in height of the rough surfaces (concave and convex portions) formed by transferring concave portions of the mold can be seen. In the example illustrated in FIGS. 19A and 19B, the areas with rough surfaces having different differences in height and formed by transferring the concave portions of the mold to a plate-like resin component having a thickness of 16 mm, that is, the areas 1201 to 1206 having different glossiness values are arranged.

Note that the ball end mill and the cutting tool information, which were used for molding the resin component of FIG. 19, are the same as those of FIG. 17. The ball end mill was used for cutting a mold, and the cutting tool information stored glossiness values. In the example of FIG. 19, the resolution was 100 dpi, and the bit diameter of the cutting tool (ball end mill) used for cutting the mold was 0.2 mm. In addition, the width (arrangement pitch) of each of the areas 1201 to 1206 in the arrangement direction was 60 mm.

The glossiness map of the areas 1201 to 1206 of FIG. 19A is set in a range from 30 to 80 (in steps of 10). In addition, by referring to the cutting tool information as illustrated in FIG. 17, a desired glossiness value, which is set in the glossiness map, can be obtained by selecting a depth of cut of the mold as follows. For example, in the area 1201, the glossiness value was controlled into 30 by selecting a depth of cut of 38 μm. In the area 1202, the glossiness value was controlled into 40 by selecting a depth of cut of 30 μm. In the area 1203, the glossiness value was controlled into 50 by selecting a depth of cut of 23 μm. In the area 1204, the glossiness value was controlled into 60 by selecting a depth of cut of 16 μm. In the area 1205, the glossiness value was controlled into 70 by selecting a depth of cut of 10 μm. In the area 1206, the glossiness value was controlled into 80 by selecting a depth of cut of 5 μm.

The material of the mold was stainless steel. First, the radius end mill was fixed to the machining center of FIG. 5 and the mold was roughly machined as described with reference to FIG. 6A, and then the surface of the mold was ground into a mirror surface by using the rotary grinder and diamond paste as described with reference to FIG. 6B. Then, an inverted shape for a step pattern of the areas 1201 to 1206 of FIG. 19 was formed on the mold by using the ball end mill. After that, injection molding was performed by using the manufactured mold, for forming the resin component having the above-described glossiness value distribution. The resin material used for the injection molding was a black HIPS.

Then, the outer surface of the resin component obtained as described above was visually observed by a person with the normal eyesight, for evaluating a gap in glossiness between steps. As a result, it was confirmed that the gap is inconspicuous on the outer surface of the manufactured resin component. Thus, the result was good because the glossiness value changes linearly in the areas 1201 to 1206 of the manufactured resin component, that is, because a difference in glossiness value between adjacent ones of the areas 1201 to 1206, which have an identical width, is kept constant.

In the example of FIG. 19, the difference in glossiness value between adjacent ones of the areas 1201 to 1206, which give different glossiness values, is 10. However, the difference in glossiness value between adjacent ones of the areas 1201 to 1206 may have any value. In addition, in Example 3, it is perceived that the difference in glossiness value between adjacent areas changes almost linearly. In the above-described machining control, however, the difference in glossiness value between adjacent areas may change in any different manner, not linearly.

In addition, the cutting tool information of FIG. 17 is information on the glossiness value obtained from a certain bit diameter of the ball-end-mill data and the depth of cut, and the information on the glossiness value is formed as a data table stored in a memory. However, such cutting tool information may not be formed as a data table. For example, the cutting tool information may be expressed by the following equation (2), which is one example of a function (equation).

$$G(D, ap) = G \times \left(1 - \frac{\pi \times 4 \times ap(D - ap)}{25.4 \div rez \times 25.4 \div rez}\right) \quad (2)$$

In the equation (2), D is a bit diameter of the cutting tool, ap is a depth of cut, rez is a resolution of concave portions formed by cutting (or projections of a molded resin component), and G is a glossiness value of the mold 93 having been ground into a mirror surface (FIG. 6B). The equation (2) that expresses the glossiness value G (D,ap) is a function expression that expresses how much the glossiness value G decreases when the concave portions are formed by cutting a mirror surface of the material of the mold 93 having the glossiness value G, and when the shape of the mold is transferred to the resin component so as to form cylindrical projections on the resin component.

The above description has been made for a rough surface in which projections (or concave portions in a mold surface) having the same shape are arranged corresponding to pixels of the glossiness map. However, the rough surface formed on the outer surface of the resin component may not have the simple structure that has the above-described projections. For example, the rough surface may be constituted by units, and each unit may correspond to a plurality of pixels of the glossiness map and have a few or a few tens of projections and concave portions arranged in a predetermined matrix and having different heights and depths. In this case, not only the projections but also the concave portions may be used and combined with each other such that a total glossiness value of the plurality of pixels becomes identical. With such a structure, the glossiness can be controlled with a high degree of flexibility, by using patterns having different spatial frequencies.

The present invention may be achieved by supplying a program that executes one or more functions of the above-described examples, to a system or device via a network or a storage media, and by causing one or more processors of a computer of the system or the device to read and execute the program. Alternatively, the present invention may be achieved by a circuit (for example, ASIC) that executes the one or more functions.

In the above-described first embodiment and examples, the description has been made as an example for the surface pattern in which the nonglossy portions are associated with the convex portions and the glossy portions are associated with the flat portions. However, the configuration of the surface pattern, such as the relationship between the glossiness and the concave or convex portions, is not limited to the above-described structure. For example, inversely to the above description, the nonglossy portions may be associated with the flat portions and the glossy portions may be associated with the convex portions in accordance with an intended design. In this case, the resin component will be manufactured such that the fine concave-and-convex structure is formed on each flat portion, for example.

Even in this case, on the outer surface of a resin component including the first area and the second area, a surface pattern in which areas with different optical properties are arranged under a specific rule is formed continuously in the first area and the second area. The resin component is formed such that the difference in height between areas with different optical properties in the surface pattern of the first area is smaller than the difference in height between areas with different optical properties in the surface pattern of the second area.

In addition, in the above-described first embodiment and examples, the design pattern, the glossiness pattern, or the concave and convex pattern is formed such that a unit area with the same size and the same shape is repeatedly disposed across the whole surface of the resin component. However, unit areas of the pattern may not necessarily be the same as each other. Since the present invention has been made for solving the problem on the difference in height of the surface pattern that affects the process to give a logo or the like to the first area, the present invention can also be applied for pattern arrangements having different spatial frequencies. For example, the spatial frequency of the glossy-pattern arrangements may be higher than the spatial frequency of the nonglossy-pattern arrangements. In such a structure, a visible gap on a boundary between an area having a large difference in height and an area having a small difference in height can be effectively reduced. This is because patterns with a high frequency attracts an observer more than patterns with a low frequency.

In addition, in the above description, a hot stamping is performed as a process to give a logo or the like to a resin component having a design pattern in which the areas with different optical properties are arranged. However, the process for numerals, characters, a figure, or a logo may be performed by using any method, other than the hot stamping, such as printing, painting, or attaching an information bearing member such as a seal or a sticker. However, if the outer surface of the resin portion has a large difference in height, the process may fail to produce a good result. Thus, when the process is performed by using any other method, the process will produce a good result if the maximum difference in height in the first area is set at a value, such as 50 µm or less, that allows the process to be performed stably.

In addition, although the mold used to mold the resin component is manufactured through the cutting process, the method of machining the mold is not limited to this. For example, the mold may be manufactured by using another method, such as a method using a laser beam machine. In addition, the injection molding that uses a mold may not necessarily be used for forming a resin component of the present invention. For example, the resin component may be manufactured by using a resin material and three-dimensionally forming areas with different optical properties through a 3D printing technology.

Second Embodiment

In a second embodiment, a product of the present invention includes a curved-surface portion. A component identical to a component of the first embodiment will be omitted, and different features will be mainly described.

Figure 22A:
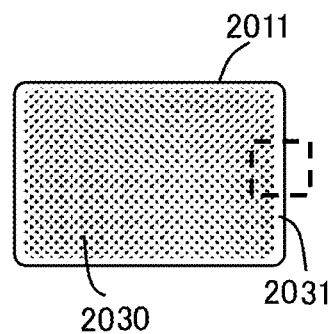
FIG. 22A is a diagram illustrating a structure of an outer surface of a conventional resin component.
Figure 22B:
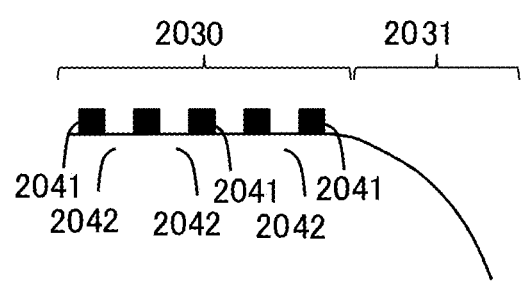
FIG. 22B is a diagram illustrating a structure of a section of the conventional resin component.

FIGS. 22A and 22B illustrate an outer surface 2011 of a conventional document cover. FIG. 22A illustrates the whole of the outer surface 2011, and FIG. 22B illustrates a cross section of a portion of FIG. 22A, indicated by a broken line. The outer surface 2011 of FIG. 22A includes a flat-surface portion 2030 (first portion) and a curved-surface portion 2031 (second portion) that surrounds four sides of the flat-surface portion 2030. The curved-surface portion 2031 is the second portion that is inclined with respect to the flat-surface portion 2030.

The surface pattern of the flat-surface portion 2030 of FIG. 22A is a surface pattern, such as a checked pattern, that is arranged under a specific rule. The surface pattern has a concave-and-convex structure in which convex portions formed when the outer surface 2011 is injection-molded is arranged under a specific rule. The concave-and-convex structure corresponds to convex portions 2041 illustrated in black color in FIG. 22B and concave portions (flat portions) 2042 illustrated in white color. As illustrated in FIGS. 22A and 22B, the concave-and-convex structure is formed on the whole of the flat-surface portion 2030 for the design and functionality. Although it is preferable in design that a surface pattern which is the same as the surface pattern, including the convex portions 2041 and the flat portions 2042 of the flat-surface portion 2030 and having a regular difference in height, be continuously formed also in the curved-surface portion 2031, the surface pattern is not formed in the curved-surface portion 2031 in a conventional configuration.

This is because if the same surface pattern including the convex portions 2041 and the flat portions 2042 was formed also in the curved-surface portion 2031, an undercut would be highly likely formed. The undercut will prevent the mold from being released in a mold releasing direction (i.e. upward direction in FIG. 22B), in the injection molding. Thus, in the conventional configuration, the surface pattern having the concave-and-convex structure is not formed on the curved-surface portion 2031. As a result, the continuity of the surface pattern that serves as a decorative surface is lost at the boundary between the flat-surface portion 2030 and the curved-surface portion 2031, causing a visible gap and deteriorating the design.

In contrast, the present embodiment provides a structure that allows the continuity of the surface pattern, which serves as a decorative surface, across the flat-surface portion 2030 (first portion) and the curved-surface portion 2031 (second portion). The flat-surface portion 2030 is a portion in which the mold releasing direction is equal to a direction in which a normal line extends, and the curved-surface portion 3031 is a portion which is inclined with respect to the flat-surface portion 2030. In the present embodiment, the surface pattern formed on the outer surface 2011 of the resin component and serving as a decorative surface is a combination of a concave-and-convex pattern having a difference in height and a glossiness pattern. The glossiness pattern is an arrangement in which the areas having different optical properties are arranged under a specific rule.

Figure 23A:
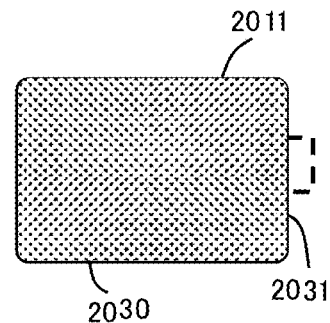
FIG. 23A is a diagram illustrating an example structure of an outer surface of a resin component that is a second embodiment of the present invention.
Figure 23B:
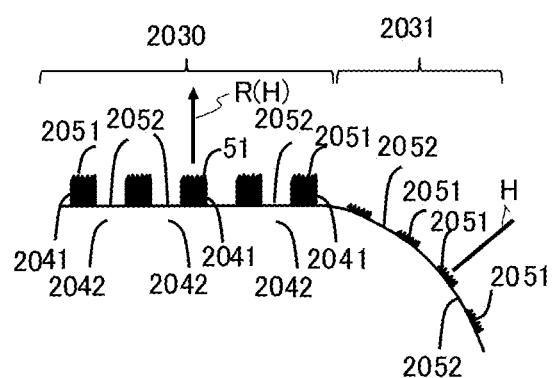
FIG. 23B is a diagram illustrating an example structure of a section of the resin component that is the second embodiment of the present invention.

FIG. 23A illustrates an outer surface 2011 of the present embodiment. FIG. 23A illustrates the whole of the outer surface 2011, and FIG. 23B illustrates a cross section of a portion of FIG. 23A, indicated by a broken line. As illustrated in FIGS. 23A and 23B, the outer surface 2011 of the present embodiment includes a flat-surface portion 2030 (first portion) and a curved-surface portion 2031 (second portion) inclined with respect to the flat-surface portion 2030.

Both of the flat-surface portion 2030 (first portion) and the curved-surface portion 2031 (second portion) have a glossiness pattern including less-glossy portions 2051 having a first optical property and glossy portions 2052 having a second optical property. The flat-surface portion 2030 (first portion) has a concave-and-convex pattern in which convex portions 2041 are arranged under a specific rule. In the present embodiment, the surface pattern is a pattern in which the glossiness pattern and the concave-and-convex pattern are combined (associated) with each other, for example. Specifically, as illustrated in FIG. 23B, in the flat-surface portion 2030 (first portion), a less-glossy portion 2051 is formed on the top portion (upper surface) of a corresponding convex portion 2041, and a glossy portion 2052 is formed on a corresponding flat portion 2042. That is, in the present embodiment, the specific rule for arranging the areas having the first optical property and the areas having the second optical property is equal to the specific rule for arranging the concave-and-convex pattern. In addition, the convex portions 2041 are either one of the areas having the first optical property and the areas having the second optical property. However, the present disclosure is not limited to this. For example, the arrangement pattern of the convex portions may be different from a design pattern in which the areas having different optical properties are arranged. Specifically, the arrangement pattern of the convex portions may be different from a pattern determined under the specific rule that arranges the areas having the first optical property and the areas having the second optical property.

The less-glossy portion 2051 has a fine concave-and-convex structure that is formed on a surface of the less-glossy portion 2051 for scattering incident light, and that is difficult to visually recognize. The glossy portion 2052 has a smooth surface that specularly reflects incident light. That is, the less-glossy portion 2051 and the glossy portion 2052 are formed by giving different surface roughness values to the outer surface 2011 of the resin component. That is, in the present embodiment, as illustrated in FIG. 23B, the flat-surface portion 2030 (first portion) includes the convex portion 2041 having the fine concave-and-convex structure formed on the top surface of the convex portion 2041 and the flat portion 2042 having a smooth surface. The flat portion 2042 is a base surface of the flat-surface portion 2030 (first portion).

On the other hand, the curved-surface portion 2031 (second portion) also has less-glossy portions 2051 and glossy portions 2052. Each of the less-glossy portions 2051 has a fine concave-and-convex structure, and the less-glossy portions 2051 and the glossy portions 2052 are disposed in the same pattern. For example, each less-glossy portion 2051 is formed on the top portion of a corresponding convex portion whose height is lower than that of the convex portion 2041 of the flat-surface portion 2030 (first portion). The glossy portion 2052 is a base surface of the curved-surface portion 2031 (second portion).

In the flat-surface portion 2030 (first portion) illustrated in FIG. 23B, a mold releasing direction (R) of the resin component is equal to a normal line (H). Since the curved-surface portion 2031 (second portion) is inclined with respect to the flat-surface portion 2030 (first portion), a normal line (H) at a certain position on the base surface is inclined with respect to the normal line R (H) of the flat-surface portion 2030 (first portion).

Both in the flat-surface portion 2030 (first portion) and the curved-surface portion 2031 (second portion), the less-glossy portions 2051 and the glossy portions 2052 are formed such that they give a similar visual impression when viewed from respective normal (front) directions to the surfaces. For example, the flat-surface portion 2030 (first portion) is formed such that a direction in which the less-glossy portions 2051 of the flat-surface portion 2030 project from the glossy portions 2052 is equal to a normal line to the base surface of the flat-surface portion 2030 (first portion). Similarly, the curved-surface portion 2031 (second portion) is formed such that a direction in which the less-glossy portions 2051 of the curved-surface portion 2031 project from the glossy portions 2052 is equal to a normal line to the base surface of the curved-surface portion 2031 (second portion). With this structure, when each surface is visually recognized in a corresponding normal (front) direction, the observer (user) will perceive a regular pattern (such as a checked pattern) that gives almost identical visual impression.

In the structure of the present embodiment illustrated in FIGS. 23A and 23B, unlike the conventional structure illustrated in FIGS. 22A and 22B, the surface (glossiness) pattern constituted by the less-glossy portions 2051 and the glossy portions 2052 is formed also on the curved-surface portion 2031. Thus, in the present embodiment, the curved-surface portion 2031 (second portion) has the concave-and-convex structure with a minimum difference in height, which is required to sufficiently form the less-glossy portion 2051. That is, the difference in height of the curved-surface portion 2031 (second portion) in the normal direction, which will cause an undercut acting in the mold releasing direction (i.e. upward direction in FIG. 23B), is smaller than the difference in height of the flat-surface portion 2030 (first portion) in the normal direction. Consequently, a molded resin component can be released from a mold with good mold releasability, and the resin component is not damaged when the resin component is released from the mold.

In the structure illustrated in FIGS. 23A and 23B, it is preferable that the convex portions 2041 of the flat-surface portion 2030 project from the flat portions 2042, which are a base surface of the flat-surface portion 2030, by a value in a range equal to or larger than 40 µm and smaller than 500 µm. The reason is that if the convex portions 2041 project by more than 40 µm, the molded product can have soil resistance against fingerprints, and that if the convex portions 2041 project by a value equal to or larger than 500 µm, a visible portion of the glossy portions becomes small at a certain angle, possibly impairing a sense of high quality. That is, in the present embodiment, it is preferable that the difference in height between the glossy portions 2052 and the less-glossy portions 2051 be equal to or larger than 40 µm and smaller than 500 µm.

Note that in a later-described example (FIGS. 25 and 26), convex portions 2083 corresponding to the above-described convex portions 2041 project by about 50 µm.

In the present embodiment, the difference in height between the glossy portions 2052 and the less-glossy portions 2051 can be obtained by using a white-light interferometer and measuring a height of the less-glossy portions 2051 with respect to the glossy portions 2052, which are a base surface of the flat-surface portion 2030. For example, in the present embodiment, the difference in height was evaluated as an average of values obtained by performing measurement at ten points of a portion of the molded product. The size of the portion was 1.0×1.4 mm, and the measurement was performed by using 3D optical profiler NewView7000 made by ZYGO Corporation and an objective lens with a magnification of 10 times.

The difference in glossiness between the less-glossy portions 2051 and the glossy portions 2052 may have any value as long as an observer can visually identify the difference. Preferably, the difference in glossiness is ten or more. Note that glossiness values in this description are measured by using a glossmeter, which is designed to measure a specular glossiness at a reflection angle of 60° under JIS Z 8741. For example, the measurement values on glossiness can be obtained by using a handy type gloss meter PG-1 made by NIPPON DENSHOKU INDUSTRIES CO. LTD. Specifically, the measurement values on glossiness can be obtained by setting the reflection angle at 60°, and pressing a photometer of the glossmeter against a glossy portion of the molded product.

In addition, it is preferable that the fine concave-and-convex structure to achieve the less-glossy portion 2051 have a step that is 15 µm or less. The reason is that if the fine concave-and-convex structure is 15 µm or less, an observer cannot visually recognize the fine concave-and-convex structure as concave and convex portions and the mold can be released smoothly without damaging the resin component, with the help of contraction coefficient of the resin in the injection molding and elasticity of the resin, even when the fine concave-and-convex structure is formed in an undercut direction. Note that the present inventors confirmed through an experiment that if a resin component has a shape of a semicircular column with a width of 100 mm and the maximum step in a direction orthogonal to the mold releasing direction is 15 or less, the mold can be released smoothly from the resin component made of a resin such as ABS or HIPS (high impact polystyrene).

Thus, in the present embodiment, the difference in height of the concave-and-convex pattern of the curved-surface portion 2031 (second portion) is not as large as that of the concave-and-convex pattern constituted by the convex portions 2041 and the flat portions 2042 of the flat-surface portion 2030 (first portion). However, the curved-surface portion 2031 has the surface pattern in which the glossy portions 2052 and the less-glossy portions 2051 are combined with each other by using the fine concave-and-convex structure whose maximum difference in height is 15 µm or less that allows the release of the mold. The surface pattern of the curved-surface portion 2031 is formed with a regular pattern that is the same as that constituted by the convex portions 2041 and the flat portions 2042 of the flat-surface portion 2030 (first portion).

That is, in the present embodiment, on the boundary between the flat-surface portion 2030 and the curved-surface portion 2031, the continuity of the glossiness pattern of the surface pattern formed on the decorative surface is at least kept. In the present embodiment, since the continuity of the glossiness pattern is kept on the boundary between the flat-surface portion 2030 (first portion) and the curved-surface portion 2031 (second portion) in this manner, it is effective that the gap in visual impression on the boundary is inconspicuous (hardly recognized visually).

If a checked pattern is used, the width of one flat portion 2042 or one convex portion 2041 (one glossy portion 2052 or one less-glossy portion 2051) is preferably 1 mm or more. This is because if the width of one flat portion 2042 or one convex portion 2041 (one glossy portion 2052 or one less-glossy portion 2051) is less than 1 mm, the glossy portions are difficult to visually recognize and the checked pattern is difficult for an observer (user) to visually identify.

Note that the geometrical structure of the surface pattern formed on the outer surface 2011 of the resin component and including the areas of glossy and nonglossy (or concave and convex) portions is not limited to the checked pattern. That is, the geometrical structure of the surface pattern may be any pattern as long as the concave and convex portions and the glossiness allow an observer to visually recognize the surface pattern.

FIGS. 4A to 4C illustrate examples of a geometrical structure of the regular surface pattern formed on the outer surface 2011 of the resin component and including the areas of glossy and nonglossy portions (or concave and convex portions). FIG. 4A illustrates a polka-dotted pattern formed as a group of circles. FIG. 4B illustrates a star-shaped pattern formed as a group of stars. FIG. 4C illustrates a triangle (scale) pattern. Thus, if the surface pattern, in which an area of an identical glossy portion and an identical nonglossy portion (or an area of a concave portion and a convex portion) is repeatedly disposed under a specific rule, is used, the resin component can be easily manufactured advantageously. Note that since the surface patterns illustrated in FIGS. 4A to 4C are merely examples, the surface pattern in which concave and convex portions or glossy and nonglossy portions are alternately arranged may be appropriately changed in design by a person skilled in the art.

In the present embodiment, the material of the resin component including the outer surface 2011 that constitutes a housing or a case of an electronic device may be a resin material such as ABS or HIPS (high impact polystyrene).

Next, a method of manufacturing a resin component of the present embodiment will be described. For example, the resin component can be injection-molded by injecting resin from a gate into a cavity formed in the mold, and by filling the cavity with the resin (forming or molding process).

FIG. 5 illustrates a configuration of a machining center that machines a mold used to mold the resin component of the present embodiment. A machining center 90 of FIG. 5 includes a machine body 91 and a control device 92. The cavity may be formed by a plurality of pieces (cavity pieces) each of which forms one portion of the mold. Thus, if the cavity is formed by the cavity pieces, a transfer surface can be divided into pieces of the surface, and the pieces of the surface can be individually machined. Thus, even though a molded product has a complex shape, production cost for the mold can be reduced.

The machine body 91 is used to manufacture the mold (cavity piece) 93 by cutting the mold 93, which is an object to be machined. The machine body 91 includes a spindle 95, an X stage 96, a Y stage 97, and a Z stage 98. The spindle 95 is a spindle that supports a cutting tool 94.

As the cutting tool 94, an end mill can be suitably used. The spindle 95 rotates the cutting tool 94 on a Z axis. The Z stage 98 supports the spindle 95, and moves the cutting tool 94 in a Z-direction with respect to the mold 93. Similarly, the X stage 96 moves the cutting tool 94 in an X direction with respect to the mold 93, and the Y stage 97 moves the cutting tool 94 in a Y-direction. With such a configuration, the machine body 91 moves an end of the cutting tool 94 in the X-, Y-, and Z-direction with respect to the mold 93, while rotating the cutting tool 94.

The control device 92 is a computer including a CPU and a memory, and controls the machine body 91 depending on NC data 99. The NC data 99 contains various instructions used in cutting process, such as the amount of movement in the X-direction, the amount of movement in the Y-direction, the amount of movement in the Z-direction, rotational speed of the spindle, feed speed in the X-direction, feed speed in the Y-direction, and feed speed in the Z-direction. The control device 92 controls the machine body 91, and thereby can move the cutting tool 94 with respect to the mold 93 while rotating the cutting tool 94, so that a three-dimensional shape based on the NC data 99 can be formed in the mold 93 by cutting the mold 93.

Figure 24A:
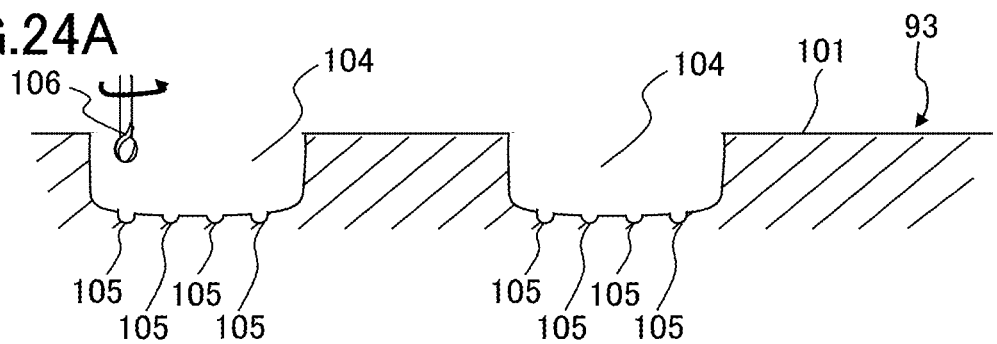
FIG. 24A is a diagram illustrating a machining process for a mold used in the second embodiment.
Figure 24B:
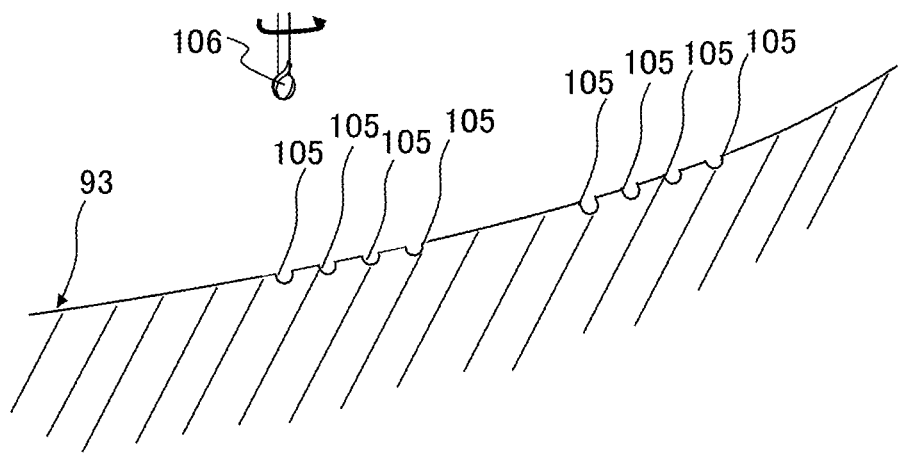
FIG. 24B is a diagram illustrating a machining process for the mold used in the second embodiment.
Figure 24C:
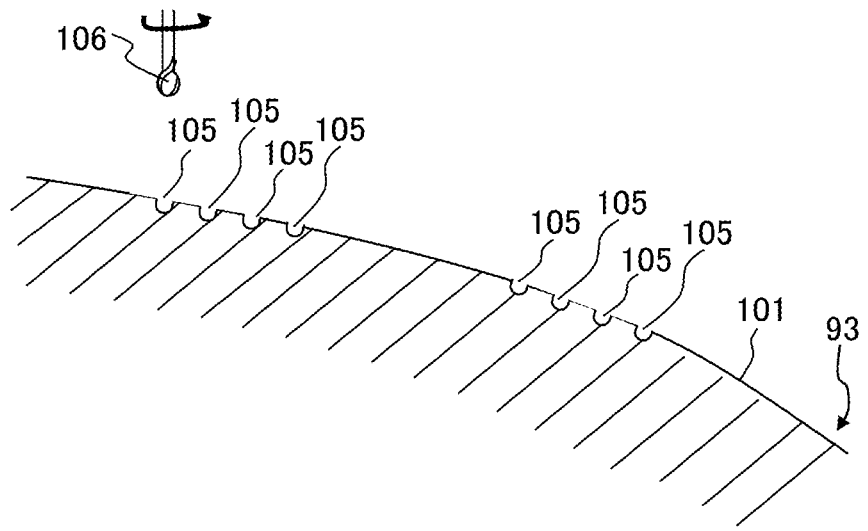
FIG. 24C is a diagram illustrating a machining process for the mold used in the second embodiment.

FIGS. 6 and 24 illustrate manufacturing processes for a first molding surface and a second molding surface of the mold 93 used to mold the flat-surface portion 2030 (first portion) and the curved-surface portion 2031 (second portion) of the resin component of the present embodiment. FIG. 6A illustrates a first mold-machining process, FIG. 6B illustrates a second mold-machining process, and FIGS. 24A and 24B or 24C illustrate a third mold-machining process. As illustrated in FIGS. 6 and 24, a transfer pattern for the surface pattern of the above-described flat-surface portion 2030 (first portion) and the curved-surface portion 2031 (second portion) is formed, through machining, on the first molding surface and the second molding surface of the mold 93.

First, in the first mold-machining process illustrated in FIG. 6A, a surface 101 of the mold 93 is roughly machined. A radius end mill 102 is used for the machining center of FIG. 5 as the cutting tool; and the surface of the mold 93 is cut, depending on the NC data 99, by scanning the surface 101 with the radius end mill 102 while rotating the radius end mill 102. Preferably, the surface 101 is cut in the first mold-machining process such that the flatness of the surface 101 is 10 µm or less, for eliminating a smoothing process to be performed in the second mold-machining process.

In the second mold-machining process of FIG. 6B, the surface 101 of the mold 93 is ground into a mirror surface by using a rotary grinder 103 and diamond paste. When the smooth mirror surface is transferred to the resin, the transferred portion forms the above-described glossy portion. Preferably, the surface 101 is ground in the second mold-machining process such that the flatness of the surface 101 is 5 µm or less, so that no difference in depth is produced in concave portions 104 when the concave portions 104 are machined in the third mold-machining process. Note that although FIGS. 6A and 6B illustrate machining for a flat surface, a curved surface can be similarly machined in accordance with predetermined curved-surface data designed by using CAD or the like.

In the third mold-machining process, the surface 101 of the mold 93 is machined by using a ball end mill 106. FIG. 24A illustrates machining for forming a portion of the mold for the above-described flat-surface portion 2030 (FIG. 23B), performed after the transfer pattern is transferred to the resin through injection molding. FIG. 24B or 24C illustrates machining for forming a portion of the mold for the above-described curved-surface portion 2031 (FIG. 23B), performed after the transfer pattern is transferred to the resin through injection molding. Note that FIG. 24B illustrates the machining for the curved-surface portion 2031 that is a convex surface as illustrated in FIG. 23B, and FIG. 24C illustrates the machining for the curved-surface portion 2031 that is a concave surface.

As illustrated in FIG. 24A, when a portion of the mold for the flat-surface portion 2030 is machined, the portion is cut and scanned, depending on the NC data 99, while the ball end mill 106 is rotated, so that the concave portions 104 are formed. When the concave portions 104 are transferred to the resin component, the convex portions 2041 are formed in the resin component. The portion is further scanned by the ball end mill 106 for forming a plurality of concave portions 105 in the bottom surface of each concave portion 104. With this operation, a fine concave-and-convex structure to form the less-glossy portion is formed in the bottom surface of the concave portion 104.

When the fine concave-and-convex structure is transferred to the resin component through injection molding, a fine concave-and-convex structure is formed on the convex portion 2041. The fine concave-and-convex structure formed on the convex portion 41 serves as the less-glossy portion 2051. In addition, as illustrated in FIG. 24B or FIG. 24C, for forming a portion of the mold for the curved-surface portion 2031, a plurality of concave portions 105 are formed in the portion of the surface 101 of the mold at positions corresponding to the less-glossy portions 2051. As illustrated in FIG. 24B, in the curved-surface portion 2031, concave portions similar to the concave portions 104 of FIG. 24A are not formed. As illustrated in FIGS. 24A to 24C, a portion of the mold in which a plurality of concave portions 105 are formed correspond to a less-glossy portion 2051, and a portion of the mold in which the concave portions 105 are not formed correspond to a glossy portion 2052.

Note that the material of the mold 93 machined as described above may be stainless steel. However, the material may be any other material for the machinability and durability in the injection molding.

In the above description, the molding for the resin component through injection molding and the manufacturing process for the mold have been described. However, the manufacturing method is not limited to the above description. The molding for the above-described resin component including the flat-surface portion 2030 and the curved-surface portion 2031 may be performed using another appropriate method other than the above-described injection molding. Hereinafter, more specific examples of the present embodiment will be described. Note that an identical member, size, or direction is given an identical reference symbol, and detailed description thereof will be omitted.

Example 4

Figure 25A:
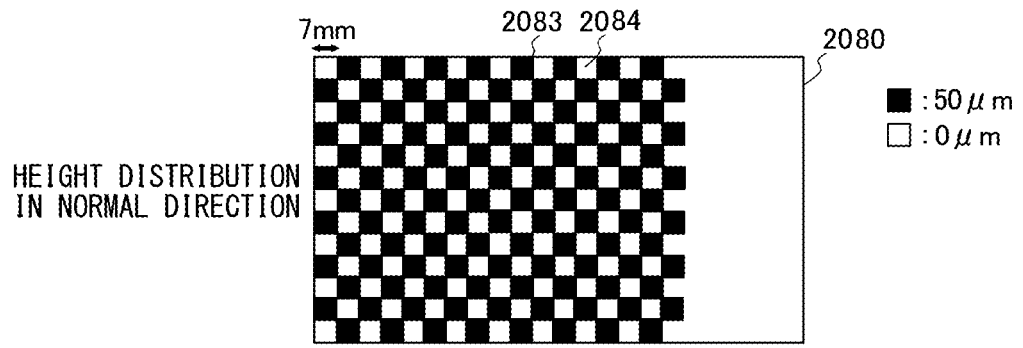
FIG. 25A is a diagram illustrating a structure of a surface of a resin component of Example 4.
Figure 25B:
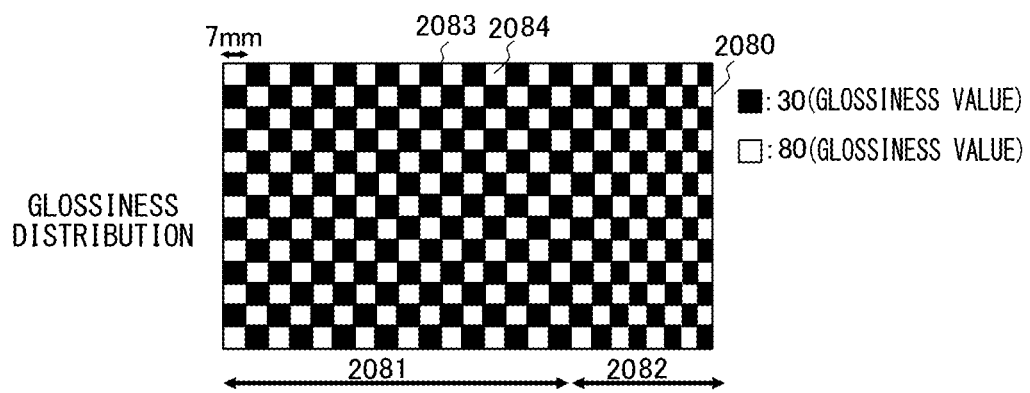
FIG. 25B is a diagram illustrating an optical property of the surface of the resin component of Example 4.
Figure 25C:
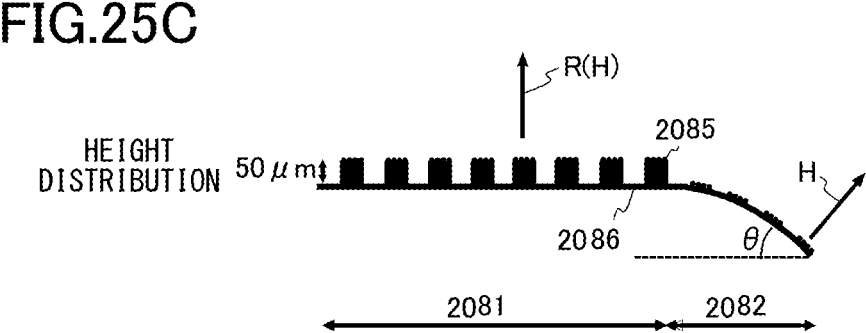
FIG. 25C is a diagram illustrating a structure of a section of the resin component of Example 4.

FIGS. 25A to 25C are diagrams illustrating a resin component of Example 4. FIG. 25A is a plan view illustrating a height distribution, FIG. 25B is a plan view illustrating a glossiness distribution, and FIG. 25C illustrates a cross-sectional view. As illustrated in FIG. 25B, a checked concave-and-convex or glossiness pattern was formed on a plate-like resin component 2080 having a thickness of 1.6 mm. Note that although the height distribution of the curved-surface portion of FIG. 25A is illustrated as 0 μm for convenience of illustration, the curved-surface portion has a pattern of a fine concave-and-convex structure with a height of 5 as can be seen in the cross-sectional view of FIG. 25C. The resin component 2080 includes a flat-surface portion 2081 (first portion) and a curved-surface portion 2082 (second portion). The curved-surface portion 2082 is formed at an edge of the flat-surface portion 2081, and inclined with respect to the flat-surface portion 2081. The curvature radius of the curved-surface portion 2082 is 60 mm, and an angle (θ) of a tangential line of the curved surface with respect to the flat-surface portion 2081 is 45 degrees at the maximum. The pitch of the checked pattern is 7 mm, and a step in the normal direction between a convex portion 2083 and a concave portion 2084 adjacent to each other is 50 μm.

In the present example, the concave-and-convex pattern having a large difference in height is formed only on the flat-surface portion 2081, and is not formed on the curved-surface portion 2082. The glossiness pattern is constituted by the less-glossy portions 2085 and the glossy portions 2086, and the less-glossy portions 2085 correspond to the convex portions 2083 and the glossy portions 2086 corresponds to the concave portions 2084. Each of the nonglossy portions 84 has a fine concave-and-convex structure having a height of 5 μm and a 60° specular glossiness of 30. The 60° specular glossiness of the glossy portions 2086, on which no fine concave-and-convex structure is formed, was set at 80. The glossiness pattern constituted by the less-glossy portions 2085 and the glossy portions 2086 was formed also on the curved-surface portion 2082. The cross-section structure of the flat-surface portion 2081 and the curved-surface portion 2082 is illustrated in FIG. 25C.

The material of the mold for manufacturing the resin component of the present example was stainless steel. First, the radius end mill was fixed to the machining center of FIG. 5 and the mold was roughly machined, and then the surface of the mold was ground into a mirror surface by using the rotary grinder and diamond paste. Then, an inverted shape of a checked pattern constituted by the convex portions 2083, the concave portions 2084, the less-glossy portions 2085, and the glossy portions 2086 was formed on the mold by using the ball end mill.

After that, injection molding was performed by using the mold, for forming the resin component 2080. The resin material used was a black HIPS, and the resin component 2080 was able to be released from the mold, without being damaged.

Then, the outer surface of the resin component was visually observed by a person with the normal eyesight, for evaluating a gap on the boundary between the flat-surface portion 2081 and the curved-surface portion 2082. As a result, although the gap caused by the presence and absence of the concave and convex portions was perceived depending on an angle at which the gap was viewed, it was confirmed that the gap is inconspicuous because the glossiness pattern is kept. In particular, it was confirmed that a visible gap for the boundary is significantly suppressed compared to a conventional resin component in which no glossiness pattern is formed in the curved-surface portion 2082.

Example 5

Figure 26A:
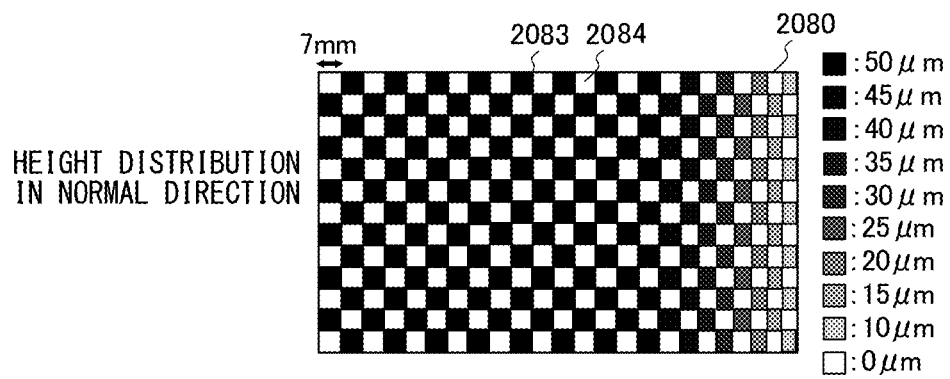
FIG. 26A is a diagram illustrating a structure of a surface of a resin component of Example 5.
Figure 26B:
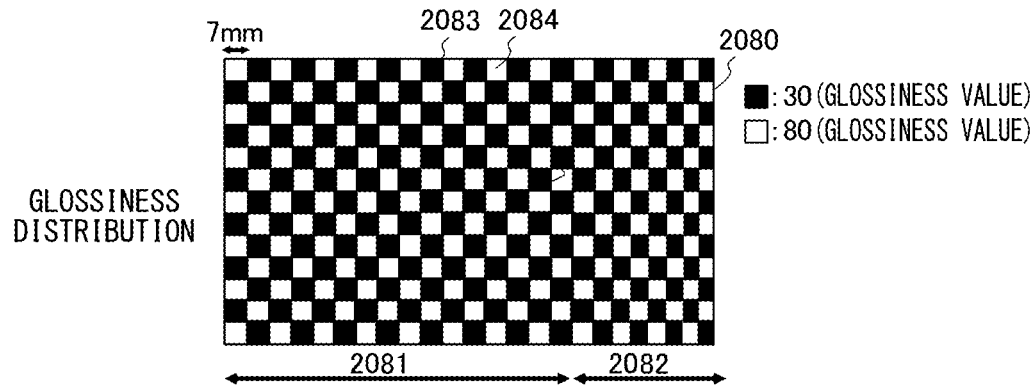
FIG. 26B is a diagram illustrating an optical property of the surface of the resin component of Example 5.
Figure 26C:
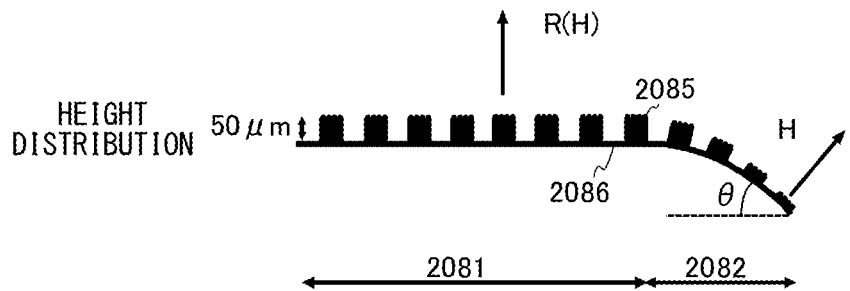
FIG. 26C is a diagram illustrating a structure of a section of the resin component of Example 5.

FIGS. 26A to 26C are diagrams illustrating a resin component of Example 5. FIG. 26A is a plan view illustrating a height distribution, FIG. 26B is a plan view illustrating a glossiness distribution, and FIG. 26C illustrates a cross-sectional view. The pitch and the step of concave and convex portions of the checked pattern are the same as those of Example 4. Example 5 differs from Example 4 in that the concave and convex portions are formed also in the curved-surface portion 2082. The height of the convex portions 2083 in the normal direction is monotonously decreased as an angle (θ) between the tangential direction of the curved-surface portion 2082 (second portion) of the present example and the flat-surface portion 2081 (first portion) increases. That is, the height is monotonously decreased as the difference in angle between the curved-surface portion and the flat-surface portion increases.

That is, in this structure, the maximum difference in height in the normal direction between adjacent areas of the surface pattern of the curved-surface portion 2082 (second portion) is decreased as the angle between the tangential direction of the curved-surface portion 2082 (second portion) and the flat-surface portion 2081 (first portion) increases.

Specifically, the height of the convex portions 2083 was decreased by 5 μm as the curved-surface portion 2082 extends from a point between the flat-surface portion 2081 and the curved-surface portion 2082, outward (rightward in FIG. 26) more by 7 mm (1 pitch). In addition, the curved-surface portion 2082 was formed such that the height of a convex portion 2083 becomes 10 μm when the curved-surface portion 2082 reaches a right edge at which the angle between the curved-surface portion 2082 and the flat-surface portion 2081 is 45 degrees.

The glossiness pattern was formed, as in Example 4, such that the less-glossy portions 2085 correspond to the convex portions 2083 and the glossy portions 2086 correspond to the concave portions 2084. The glossiness value of the less-glossy portions 2085 was set at 2030, and the glossiness value of the glossy portions was set at 2080. The glossiness pattern constituted by the less-glossy portions 2085 and the glossy portions 2086 was formed across the whole of both the flat-surface portion 2081 and the curved-surface portion 2082. The cross-section structure of the flat-surface portion 2081 and the curved-surface portion 2082 is illustrated in FIG. 26C.

The material of the mold for manufacturing the resin component of the present example was stainless steel. First, the radius end mill was fixed to the machining center 90 of FIG. 5 and the mold was roughly machined, and then the surface of the mold was ground into a mirror surface by using the rotary grinder and diamond paste. Then, an inverted shape of a checked pattern constituted by the convex portions 2083, the concave portions 2084, the less-glossy portions 2085, and the glossy portions 2086 was formed on the mold by using the ball end mill.

After that, the resin component 2080 was produced by using the manufactured mold and casting the resin material in injection molding. In this operation, the resin material used was a black HIPS. The resin component 2080 was not damaged, and was able to be released from the mold smoothly.

Then, the outer surface of the resin component was visually observed by a person with the normal eyesight, for evaluating a gap on the boundary between the flat-surface portion 2081 and the curved-surface portion 2082. As a result, it was confirmed that the gap on the boundary is reduced (effect in Example 4) because the glossiness pattern is kept in the curved-surface portion 2082, and that the visible gap is more inconspicuous because the concave and convex portions change step by step.

Other Examples

In the above-described embodiments and examples, the less-glossy portions correspond to the convex portions, and the glossy portions correspond to the concave portions. However, the relationship between the glossiness and the concave or convex portions is not limited to this. The decorative surface that expresses a certain design may have a surface pattern in which the less-glossy portions correspond to the concave portions and the glossy portions correspond to the convex portions. For example, the fine concave-and-convex structure may be formed on the concave portions of the resin component.

In addition, although the glossiness pattern is equal to the concave-and-convex pattern in the above-described embodiments and examples, the glossiness pattern may not necessarily be equal to the concave-and-convex pattern. For example, the present invention can also be applied for a pattern having different spatial frequencies. In this case, if the spatial frequency of the glossiness pattern is higher than the spatial frequency of the concave-and-convex pattern, the visible gap of the boundary can be more reduced. This is because patterns with a high frequency attracts people more than patterns with a low frequency.

In addition, although the height of the convex portions 2083 is changed linearly in steps of 5 μm in the above-described Example 5, the height may be set in accordance with the difference in angle between the flat-surface portion 2081 and the curved-surface portion 2082. For example, if the mold releasing direction is orthogonal to the flat-surface portion 2081, a difference DU in height between a convex portion and a concave portion formed in a direction orthogonal to a mold releasing direction that causes an undercut can be expressed by using the following equation (3).

$$D_U = (D + D_M)\sin(\theta) \tag{3}$$

In the equation (3), D denotes a height of the convex portions 2083, DM denotes a height of the fine concave-and-convex structure that forms the less-glossy portion 2085 on the convex portions 2083, and θ is an angle between a base surface on which a convex portion 2083 is formed and the flat-surface portion 2081. The height D of each convex portion of the curved-surface portion 2082 may be set such that DU is equal to or smaller than a height that allows the mold to be released.

In addition, although the mold for the resin component of the present invention is formed through the cutting process in the above-descried embodiments and examples, the method of machining the mold is not limited to this. For example, the mold may be manufactured by using another method, such as a method using a laser beam machine.

The present invention can be suitably applied for a resin component whose outer surface includes an area in which a process such as lettering is performed, the resin component on which the process such as lettering has been performed, an electronic device in which the resin component is used, and a method of manufacturing the resin component. For example, a logo or the like can be given, through a process, to an outer surface of a product on which a design pattern having a difference in height (concave and convex portions) is formed, without significantly deteriorating the quality of external appearance in design. In addition, an inclined surface or a curved surface can be formed without significantly deteriorating the quality of external appearance in design.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A product comprising:
   a first region; and
   a second region located at a different position from the first region,
   wherein the first region includes a plurality of first concave-and-convex structures having a first optical property and a plurality of first flat areas having a second optical property, and the plurality of first concave-and-convex structures and the plurality of first flat areas are alternately arranged,
   wherein the second region includes a plurality of convex portions and a plurality of second flat areas having the second optical property, and a plurality of second concave-and-convex structures having the first optical property are arranged on upper surfaces of the plurality of convex portions, and the plurality of convex portions and the plurality of second flat areas are alternately arranged, and
   wherein a glossiness value of the first optical property is lower than a glossiness value of the second optical property, and a height of areas in which the plurality of first concave-and-convex structures are arranged is lower than a height of the upper surfaces of the plurality of convex portions.

2. The product according to claim 1, wherein the plurality of first concave-and-convex structures have a different surface roughness than the plurality of first flat areas.

3. The product according to claim 1, wherein a distance between a first concave-and-convex structure and a plane on which the plurality of first flat areas are arranged is equal to or smaller than 15 µm.

4. The product according to claim 1, wherein a distance between a second concave-and-convex structure and a plane on which the plurality of second flat areas are arranged is 15 µm to 500 µm.

5. The product according to claim 1, wherein a distance between a second concave-and-convex structure and a plane on which the plurality of second flat areas are arranged decreases as the second concave-and-convex structure is located closer to the first region.

6. The product according to claim 1, wherein a first concave-and-convex structure is arranged on upper surfaces of each of a plurality of first convex portions provided in the first region, and a second concave-and-convex structure is arranged on upper surfaces of each of plurality of convex portions provided in the second region.

7. The product according to claim 1, wherein the glossiness value changes linearly in a direction from the second region toward the first region.

8. The product according to claim 1, further comprising a third optical property area formed in the first region.

9. The product according to claim 1, wherein at least one of characters, numerals, and a figure is given to the first region.

10. The product according to claim 1, wherein the first region is located on a curved surface.

11. The product according to claim 1, wherein a distance between a second concave-and-convex structure and a plane on which the plurality of second flat areas are arranged changes such that a glossiness value of an outer surface changes linearly in an arrangement direction of the plurality of second concave-and-convex structures.

12. The product according to claim 11, wherein the plurality of second concave-and-convex structures have an identical length in the arrangement direction of the plurality of second concave-and-convex structures.

13. The product according to claim 11, wherein a pitch of each second concave-and-convex structure is less than 1 mm.

14. The product according to claim 11, wherein the glossiness value is a 60° specular glossiness.

15. The product according to claim 11, wherein the plurality of first concave-and-convex structures contain an area to which at least one of characters, numerals, and a figure is given.

16. An electronic device comprising the product according to claim 1 and an electronic component.

17. The product according to claim 1, wherein glossiness of the plurality of first concave-and-convex structures is lower than glossiness of the plurality of first flat areas, and glossiness of the plurality of second concave-and-convex structures is lower than glossiness of the plurality of second flat areas.

* * * * *